United States Patent
Zhang et al.

(10) Patent No.: US 12,311,285 B2
(45) Date of Patent: May 27, 2025

(54) OBJECT'S MOTION ATTITUDE ADJUSTING APPARATUS, AND PUNCTURING, LIQUID FILLING AND MIXING SYSTEM

(71) Applicant: SHENZHEN THISTORY BIO-MEDICAL CO., LTD, Guangdong (CN)

(72) Inventors: Huali Zhang, Guangdong (CN); Huawei Zhang, Guangdong (CN); Dekai Quan, Guangdong (CN); Peng Xue, Guangdong (CN)

(73) Assignee: SHENZHEN THISTORY BIO-MEDICAL CO., LTD, Shenzhen (CN)

( * ) Notice: Subject to any disclaimer, the term of this patent is extended or adjusted under 35 U.S.C. 154(b) by 195 days.

(21) Appl. No.: 18/201,777

(22) Filed: May 25, 2023

(65) Prior Publication Data

US 2023/0294011 A1    Sep. 21, 2023

Related U.S. Application Data

(63) Continuation of application No. PCT/CN2022/104569, filed on Jul. 8, 2022.

(30) Foreign Application Priority Data

Dec. 8, 2021    (CN) .......................... 202111495385.X

(51) Int. Cl.
*F16H 19/08*    (2006.01)
*A63H 33/30*    (2006.01)
*B01F 31/23*    (2022.01)
*B01F 35/71*    (2022.01)

(52) U.S. Cl.
CPC .............. *A63H 33/30* (2013.01); *B01F 31/23* (2022.01); *B01F 35/7131* (2022.01); *F16H 19/08* (2013.01)

(58) Field of Classification Search
CPC .......... B01F 31/23; F16M 11/08; F16H 19/08
See application file for complete search history.

(56) References Cited

U.S. PATENT DOCUMENTS

| | | | | |
|---|---|---|---|---|
| 4,576,209 A | * | 3/1986 | Eisenberg | B65B 1/363 222/196 |
| 4,625,775 A | * | 12/1986 | Schaltegger | B65B 43/50 198/346.2 |
| 2003/0226616 A1 | * | 12/2003 | Tawa | B67C 3/22 141/144 |

* cited by examiner

Primary Examiner — Jason K Niesz

(57) ABSTRACT

The present invention belongs to the technical field of an object driving device, in particular to an object's motion attitude adjusting device and a puncturing, liquid filling and mixing system. The object's motion attitude adjusting apparatus includes a turntable, a plurality of object's motion attitude adjusting devices provided on the turntable, the object's motion attitude adjusting device including a base and a plurality of object's motion attitude adjusting mechanisms provided on the base, a first driving wheel connected with each of the object's motion attitude adjusting mechanisms in a transmission manner, a first driving component connected with the turntable for driving the turntable, and a second driving component connected with the first driving wheel for driving the first driving wheel.

17 Claims, 11 Drawing Sheets

OBJECT'S MOTION ATTITUDE ADJUSTING APPARATUS, AND PUNCTURING, LIQUID FILLING AND MIXING SYSTEM

CROSS-REFERENCE TO RELATED APPLICATIONS

The present application is a Continuation Application of PCT Application No. PCT/CN2022/104569, filed on Jul. 8, 2022, which claims the priority of Chinese Patent Application No. 202111495385.X, filed on Dec. 8, 2021, the entire contents of which are hereby incorporated by reference.

TECHNICAL FIELD

The invention belongs to the technical field of an object driving device, in particular to an object's motion attitude adjusting device and a puncturing, liquid filling and mixing system.

BACKGROUND

In people's life and work scenes, object's motion attitude adjusting devices are always needed to adjust the motion attitude of the objects or people. In toy applications, for example, a plaything which uses object's motion attitude adjusting devices to adjust the motion attitudes of the toys or the ornaments is common, where the toys or the ornaments can assume various attitudes, which serves as a stress reliever for people and brings people with enjoy. In amusement facilities, the object's motion attitude adjusting devices can adjust the players' motion attitudes to simulate various scenes, bringing the players extremely exciting experiences. In automatic cookers, the object's motion attitude adjusting devices can adjust the motion attitudes of the pan so that the food material in the pan can be mixed more fully or the heating can be more uniform, bringing better taste. In the field of biochemistry, the object's motion attitude adjusting devices can adjust the motion attitudes of the containers containing different chemicals, so that the chemicals can be mixed more uniformly.

However, the existing object's motion attitude adjusting devices are usually provided separately and work separately, with a poor integration. If the motion attitudes of a plurality of objects are required to be adjusted, a plurality of object's motion attitude adjusting devices are needed, which greatly limits the application effects and application fields of the object's motion attitude adjusting devices.

SUMMARY

In the embodiments of the invention, an object's motion attitude adjusting mechanism is provided, which aims to solve the problem that the existing object's motion attitude adjusting devices are provided independently, work independently, with poor integration, resulting in a problem that the application effects and application fields are greatly limited.

In order to solve the above technical problem, the present invention provides an object's motion attitude adjusting apparatus which includes:
   a turntable;
   a plurality of object's motion attitude adjusting devices provided on the turntable, the object's motion attitude adjusting device including a base and a plurality of object's motion attitude adjusting mechanisms provided on the base;
   a first driving wheel connected with each of the object's motion attitude adjusting mechanisms in a transmission manner;
   a first driving component connected with the turntable for driving the turntable; and
   a second driving component connected with the first driving wheel for driving the first driving wheel.

When the first driving component is in operation, driven by the first driving component, the turntable rotates to drive the object's motion attitude adjusting devices to move circumferentially around an axis of the turntable.

When the second driving component is in operation, driven by the second driving component, the first driving wheel rotates to drive the object's motion attitude adjusting mechanisms to move circumferentially around axes of the respective bases and to adjust the motion attitudes thereof.

Further, the first driving component includes:
   a first transmission shaft; and
   a first power output component connected with the first transmission shaft.

Further, the second driving component includes:
   a second transmission shaft connected with the first driving wheel; and
   a second power output component connected with the second transmission shaft.

Further, the first power output component includes a first motor connected with the first transmission shaft, a first wheel provided on the first transmission shaft, and a second wheel meshed with the first wheel and provided on the second transmission shaft through a bearing, and the second wheel is fixedly connected with the turntable; and the second power output component includes a second motor connected with the second transmission shaft.

Further, the object's motion attitude adjusting mechanism includes:
   a frame;
   a third driving component;
   a supporting component provided on the frame and connected with the third driving component in a transmission manner;
   an object carrier provided on the supporting component and movable relative to the supporting component; and
   a fourth driving component provided on the frame and connected with the object carrier in a transmission manner.

When the third driving component drives the supporting component to swing or roll, the object carrier swings or rolls along with the supporting component while being rotated by the fourth driving component.

Further, the object carrier includes:
   an object carrying portion; and
   a first driven wheel provided on the object carrying portion and connected with the fourth driving component in a transmission manner.

The object carrying portion is provided with at least one object receiving space.

Further, the fourth driving component is a second driving wheel connected with the first driven wheel in a transmission manner.

Further, the second driving wheel is a static wheel, and the static wheel is fixed on the frame.

Furthermore, the supporting component includes:
   a supporter rotatably assembled with the object carrying portion for driving the object carrying portion to swing or roll, and a second driven wheel provided on the supporter and connected with the third driving component in a transmission manner.

Further, the second driven wheel is a gear, and a rotational angular velocity ratio of the second driven wheel to the turntable is in a multiple relationship with the number of the object's motion attitude adjusting devices.

Furthermore, the second driven wheel and the first driving wheel are both gears, and a rotational angular velocity ratio of the second driven wheel to the first driving wheel is in a multiple relationship with the number of the object's motion attitude adjusting mechanisms.

Further, the first driven wheel is fixedly fitted to an outer periphery of the object carrying portion.

The object carrying portion is inserted in the supporter and limited by and rotatably engaged with the supporter.

Further, the frame includes:
two support columns.

The supporting component is connected with the two support columns through shaft(s).

Further, the object's motion attitude adjusting device further includes:
 a fifth driving component provided on the base and connected with the third driving component of each of the object's motion attitude adjusting mechanisms in a transmission manner, and
 a third driven wheel fixed below the base and connected with the first driving wheel in a transmission manner.

The first driving wheel is configured to drive the third driven wheel to rotate, thereby driving the fifth driving component to operate; the fifth driving component is configured to drive the respective third driving components to operate simultaneously or sequentially; the third driving component is configured to drive the supporting component of the respective object's motion attitude adjusting mechanism to swing or roll, and drive the respective object carrying portion to rotate while swinging or rolling with the respective supporting component.

Further, the fifth driving component has a third driving wheel.

The third driving component is a driven wheel or a driven wheel set connected with the third driving wheel and the respective supporting component in a transmission manner, respectively.

Further, the driven wheel set includes:
 a primary driven wheel connected with the supporting component in a transmission manner, and
 a secondary driven wheel connected with the third driving wheel in a transmission manner.

The embodiment of the present invention also provides a puncturing and fluid filling and mixing system, which includes:
 a frame;
 a puncturing module;
 a fluid filling module; and
 the object's motion attitude adjusting apparatus as described above.

The puncturing module, the liquid filling module and the object's motion attitude adjusting apparatus are all provided on the frame.

The object's motion attitude adjusting apparatus is configured to transfer a container to a puncturing and liquid filling position, the puncturing module is configured to puncture a cover of the container, the liquid filling module is configured to fill liquid to the container, and the object's motion attitude adjusting apparatus is configured to operate to mix contents of the container.

In the present invention, the object's motion attitude adjusting apparatus includes a plurality of object's motion attitude adjusting devices, and the object's motion attitude adjusting device includes a plurality of object's motion attitude adjusting mechanisms which can drive a plurality of objects to adjust the motion attitudes thereof simultaneously, with an extremely high integration, improving the motion attitude adjusting effect and broadening the applications greatly.

DESCRIPTION OF THE EMBODIMENTS

In order to make the objectives, technical schemes and advantages of the present invention more apparent, the present invention will be further described in detail with reference to the drawings and embodiments. It should be understood that the specific embodiments described herein are merely illustrative of the invention and are not intended to limit the invention.

The present invention provides an object's motion attitude adjusting apparatus. After objects are arranged on object's motion attitude adjusting mechanisms, a first driving component is operated to drive object's motion attitude adjusting devices to move around the axis of a turntable, and a second driving component is operated to drive a first driving wheel to rotate. The first driving wheel drives the object's motion attitude adjusting mechanisms to move around the axes of the respective bases and to adjust the motion attitudes thereof, and the objects also follow the object's motion attitude adjusting mechanisms to adjust the motion attitudes thereof. The object's motion attitude adjusting apparatus includes a plurality of object's motion attitude adjusting devices, and the object's motion attitude adjusting device includes a plurality of object's motion attitude adjusting mechanisms which can drive a plurality of objects to adjust the motion attitudes thereof simultaneously, with an extremely high integration, improving the motion attitude adjusting effect and broadening the applications greatly. In toy applications, for example, the object's motion attitude adjusting apparatus can drive a plurality of ornaments to adjust the motion attitudes thereof simultaneously. In amusement facilities, the object's motion attitude adjusting apparatus can drive a plurality of players to adjust the motion attitudes thereof simultaneously. In automatic cookers, the object's motion attitude adjusting apparatus can drive a plurality of cooking vessels to adjust the motion attitudes thereof simultaneously. In chemical mixing application, the object's motion attitude adjusting apparatus can drive a plurality of chemical containers to adjust the motion attitudes thereof simultaneously. In the above-mentioned applications, only one object's motion attitude adjusting apparatus is required.

Embodiment 1

Figure 1:
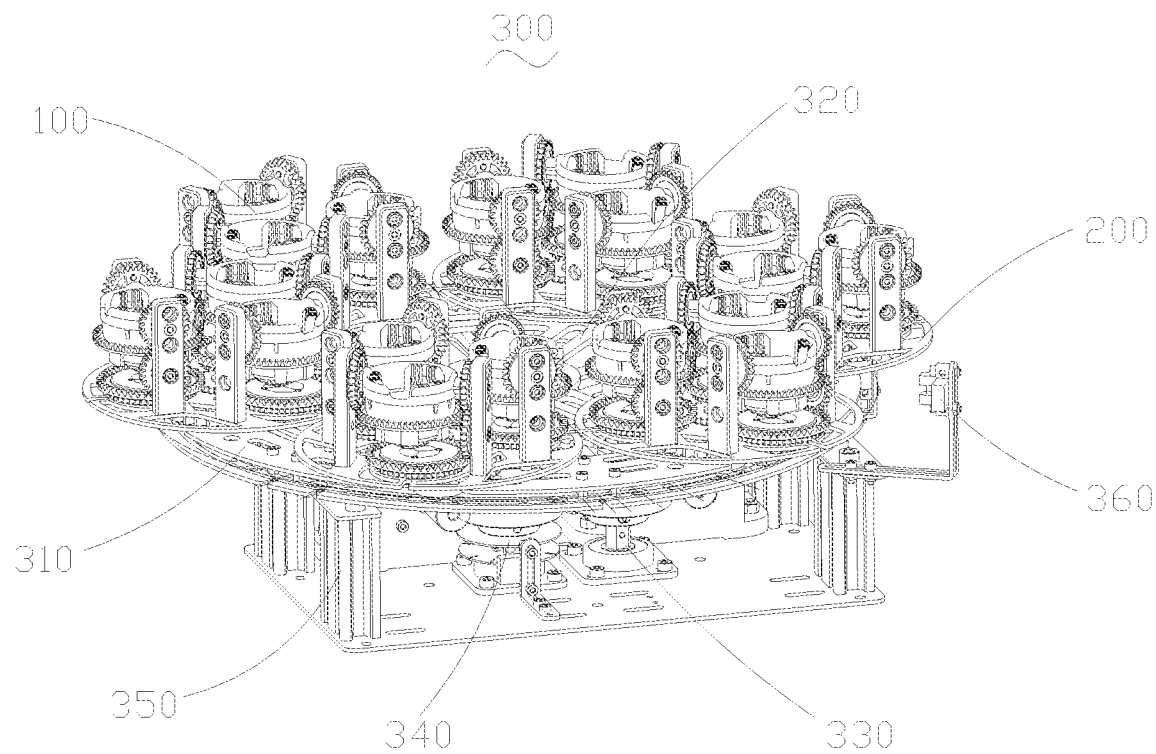
FIG. 1 is a schematic view of an object's motion attitude adjusting apparatus according to an embodiment of the present invention.

Referring to FIG. 1, a first embodiment of the present invention provides an object's motion attitude adjusting apparatus 300, which includes:
- a turntable 310;
- a plurality of object's motion attitude adjusting devices 200 disposed on the turntable 310; the object's motion attitude adjusting device 200 includes a base 210 and a plurality of object's motion attitude adjusting mechanisms 100 disposed on the base 210;
- a first driving wheel 320 which is connected to each of the object's motion attitude adjusting mechanisms 100 in a transmission manner;
- a first driving component 330 connected to the turntable 310 for driving the turntable 310, and
- a second driving component 340 connected to the first driving wheel 320 for driving the first driving wheel 320.

When the first driving component 330 works, the turntable 310 is driven by the first driving component 330 to rotate to drive the object's motion attitude adjusting devices 200 to move circumferentially around the axis of the turntable 310.

When the second driving component 340 works, the first driving wheel 320 is driven by the second driving component 340 to rotate to drive the object's motion attitude adjusting mechanisms 100 to move circumferentially around the axes of the respective bases 210.

The above-mentioned "in a transmission manner" refers to that the motion of one member can be transmitted to another member to change the motion of the other member. For example, the first driving wheel 320 being connected to the object's motion attitude adjusting mechanisms 100 in a transmission manner means that the motion of the first driving wheel 320 can be transmitted to the object's motion attitude adjusting mechanisms 100 to drive the object's motion attitude adjusting mechanisms 100 to move. In the present embodiment, the object's motion attitude adjusting mechanisms 100 are driven by the first driving wheel 320 to move around the axes of the respective bases 210 and adjust the motion attitudes thereof.

Referring to FIG. 1, the object's motion attitude adjusting apparatus 300 further includes fixing seats 350, on which the turntable 310, the first driving component 330, and the second driving component 340 are disposed. The fixing seats 350 support the turntable 310, the first driving component 330, and the second driving component 340. The first driving wheel 320 is connected with and driven by the second driving component 340 which in turn supports the first driving wheel 320.

The first driving wheel 320 can be arranged inside or outside of the turntable 310. For example, the turntable 310 can be provided as an outer member, and the first driving wheel 320 can be provided as an inner member at the centre of the turntable 310; or the first driving wheel 320 can be provided as an outer member, and the turntable 310 can be provided as an inner member at the centre of the first driving wheel 320.

Figure 2:
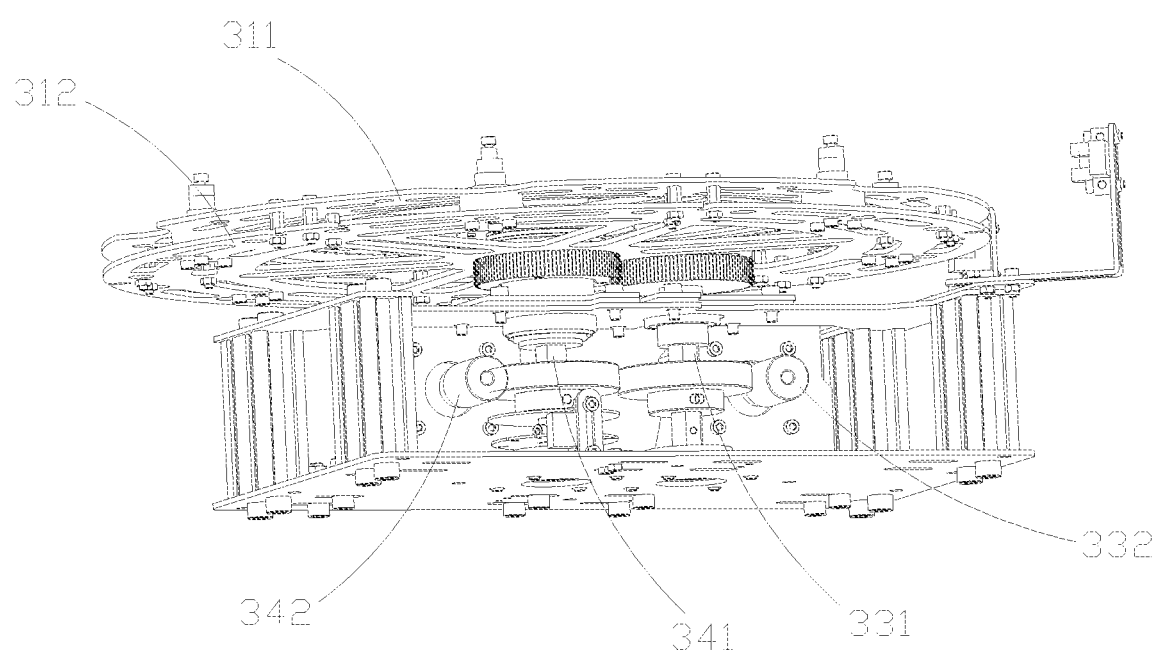
FIG. 2 is a schematic view of a turntable and a structure below the turntable according to an embodiment of the present invention.

Referring to FIG. 2, the turntable 310 is provided with an upper turntable 311 and a lower turntable 312. The upper turntable 311 and the lower turntable 312 are fixedly connected with each other by screw(s) or bolt(s). As a plurality of object's motion attitude adjusting devices 200 are disposed on the turntable 310, the turntable 310 needs to bear a great weight. Therefore, the two-layer turntable 310 is provided in order to improve the reliability of the turntable 310.

When the first driving component 330 works, the turntable 310 is driven by the first driving component 330 to rotate, thereby driving the object's motion attitude adjusting devices 200 to move circumferentially around the axis of the turntable 310, adjusting the positions of the specific object's motion attitude adjusting devices 200; the first driving wheel 320 drives the object's motion attitude adjusting mechanisms 100 to move circumferentially around the axes of the respective bases 210, adjusting the positions of the specific object's motion attitude adjusting mechanisms 100 and the motion attitudes of the object's motion attitude adjusting mechanisms 100. The objects arranged on the object's motion attitude adjusting mechanisms 100 also follow the object's motion attitude adjusting mechanisms 100 to adjust the motion attitudes thereof.

It should be noted that when the first driving component 330 operates, the second driving component 340 can operate in opposite direction to the first driving component 330 or at a differential speed from the first driving component 330, or stop operating. As the second driving component 340 can operate in opposite direction to the first driving component 330 or at a differential speed from the first driving component 330, or stop operating, the first driving wheel 320 can drive the object's motion attitude adjusting mechanisms 100 to move circumferentially around the axes of the respective bases 210 and adjust the motion attitudes of the object's motion attitude adjusting mechanisms 100.

In another case, when the first driving component 330 operates, the second driving component 340 can operate in the same direction as the first driving component 330, and the speeds of the turntable 310 and the first driving wheel 320 are the same. In this case, the turntable 310 drives the object's motion attitude adjusting devices 200 to move circumferentially around the axis of the turntable 310, while the first driving wheel 320 does not drive the object's motion attitude adjusting mechanisms 100 to move circumferentially around the axes of the respective bases 210 or drive the object's motion attitude adjusting mechanisms 100 to adjust the motion attitudes thereof. Therefore, the rotation speed of the turntable 310 can be higher, driving the object's motion attitude adjusting devices 200 to move faster.

When the second driving component 340 operates, the first driving wheel 320 is driven by the second driving component 340 to rotate, and the first driving wheel 320 drives the object's motion attitude adjusting mechanisms 100 to move circumferentially around the axes of the respective bases 210, adjusting the positions of the specific object's motion attitude adjusting mechanisms 100, and the motion attitudes of the object's motion attitude adjusting mechanisms 100. The objects arranged on the object's motion attitude adjusting mechanisms 100 also follow the object's motion attitude adjusting mechanisms 100 to adjust the motion attitudes thereof.

It should be noted that when the second driving component 340 operates, the first driving component 330 can operate in opposite direction to the second driving component 340 or at a differential speed from the second driving component 340, or stop operating.

For example, first, the first driving component 330 operates and drives the turntable 310 to rotate. The turntable 310 drives the object's motion attitude adjusting devices 200 to move circumferentially around the axis of the turntable 310, thereby adjusting the positions of the object's motion attitude adjusting devices 200. The first driving wheel 320 also simultaneously drives the object's motion attitude adjusting mechanisms 100 to move circumferentially around the axes of the respective bases 210, adjusting the motion attitudes of the object's motion attitude adjusting mechanisms 100. Then, the second driving component 340 operates and drives the first driving wheel 320 to rotate, and the first driving wheel 320 drives the object's motion attitude adjusting mechanisms 100 to move circumferentially around the axes of the respective bases 210, further precisely adjusting the positions of the object's motion attitude adjusting mechanisms 100 which adjust the motion attitudes while moving circumferentially. When one of the object's motion attitude adjusting mechanisms 100 rotates to a stop position, the first driving component 330 and the second driving component 340 stop operating.

The object's motion attitude adjusting apparatus 300 includes a plurality of object's motion attitude adjusting devices 200, and the object's motion attitude adjusting device 200 includes a plurality of object's motion attitude adjusting mechanisms 100, which can drive a plurality of objects to adjust the motion attitudes thereof simultaneously, with an extremely high integration, improving the motion attitude adjusting effect and broadening the applications greatly. In toy applications, for example, the object's motion attitude adjusting apparatus 300 can drive a plurality of ornaments to adjust the motion attitudes thereof simultaneously. In amusement facilities, the object's motion attitude adjusting apparatus 300 can drive a plurality of players to adjust the motion attitudes thereof simultaneously. In automatic cookers, the object's motion attitude adjusting apparatus 300 can drive a plurality of cooking vessels to adjust the motion attitudes thereof simultaneously. In chemical mixing application, the object's motion attitude adjusting apparatus 300 can drive a plurality of chemical containers to adjust the motion attitudes thereof simultaneously. In the above-mentioned applications, only one object's motion attitude adjusting apparatus 300 is required.

In other embodiments, the object's motion attitude adjusting apparatus 300 can also be applied in other applications, for example, a product display table, a dice shaking device and the like, which will not be described herein.

The object's motion attitude adjusting apparatus 300 further includes a detector 360 fixedly disposed on the fixing seat 350. The detector 360 can be used for detecting the positions of the object's motion attitude adjusting mechanisms 100. The detector 360 can be an optical coupling device, which refers to a device that uses light as a medium to transmit electrical signals, converts the emitted optical signals and feedback optical signals into electrical signals, and accurately determines the positions of the object's motion attitude adjusting mechanisms 100 by evaluating the electric signals.

In the present embodiment, six object's motion attitude adjusting device 200 are provided, and three object's motion attitude adjusting mechanisms 100 are provided on each of the object's motion attitude adjusting devices 200. In other words, there are eighteen object's motion attitude adjusting mechanisms 100, with a high integration. In some applications, for example, in chemical mixing application, a batch work can be realized, and the work efficiency can be greatly improved.

Embodiment 2

Referring to FIG. 2, on the basis of the first embodiment, the first driving component 330 of the second embodiment includes:
a first transmission shaft 331, and
a first power output component 332 connected to the first transmission shaft 331.

The first transmission shaft 331 is connected to the turntable 310 for driving the turntable 310. The first power output component 332 outputs power to the first transmission shaft 331, and the first transmission shaft 331 drives the turntable 310 to rotate.

The first power output component 332 can be a motor which is connected with the first transmission shaft 331 in a transmission manner by means of a worm gear transmission.

The motor outputs power to the first transmission shaft 331, and the first transmission shaft 331 drives the turntable 310 to rotate.

Embodiment 3

Figure 3:
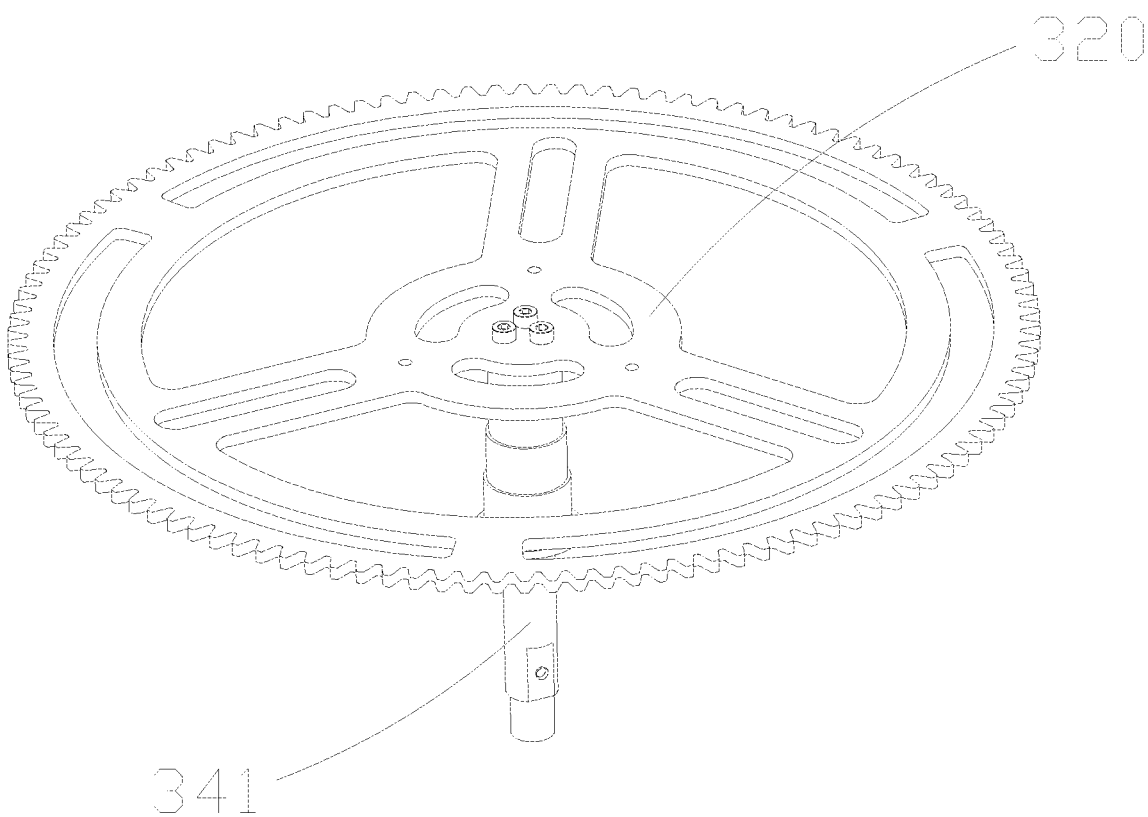
FIG. 3 is a schematic view of a first driving wheel and a second transmission shaft assembled together according to an embodiment of the present invention.

Referring to FIG. 2 and FIG. 3, on the basis of the second embodiment, the second driving component 340 of the third embodiment includes:
- a second transmission shaft 341 connected to the first driving wheel 320; and
- a second power output component 342 connected to the second transmission shaft 341.

The second power output component 342 outputs power to the second transmission shaft 341, and the second transmission shaft 341 drives the first driving wheel 320 to rotate.

The second power output component 342 can be a motor which is connected with the second transmission shaft 341 in a transmission manner by means of a worm gear transmission. The motor outputs power to the second transmission shaft 341, and the second transmission shaft 341 drives the turntable 310 to rotate.

Embodiment 4

Figure 4:
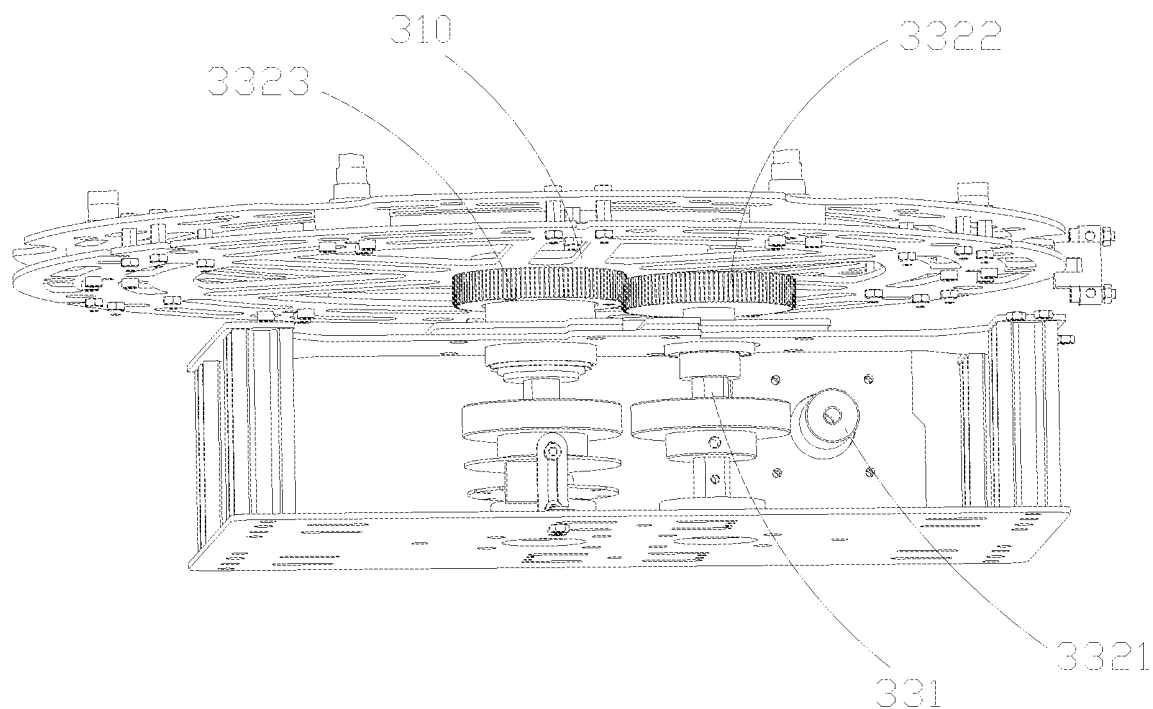
FIG. 4 is another schematic view of a turntable without a second motor and the structure below the turntable according to an embodiment of the present invention.

Referring to FIG. 4, on the basis of the third embodiment, the first power output component 332 of the fourth embodiment includes a first motor 3321 connected to the first transmission shaft 331, a first wheel 3322 disposed on the first transmission shaft 331, and a second wheel 3323 engaged with the first wheel 3322 and disposed on the second transmission shaft 341 through a bearing 3324. The second wheel 3323 is fixedly connected to the turntable 310. The second power output component 342 includes a second motor connected to the second transmission shaft 341.

The bearing 3324 includes an outer ring, an inner ring, and rolling elements provided between the outer ring and the inner ring. The second wheel 3323 surrounds the outer ring, and the inner ring surrounds the second transmission shaft 341. When the second wheel 3323 rotates, the outer ring is driven by the second wheel 3323 to rotate, while the inner ring would not rotate with the outer ring due to the rolling elements. Therefore, the innermost second transmission shaft 341 would not be affected by the outermost rotating second wheel 3323. In turn, when the second transmission shaft 341 rotates, it will drive the inner ring to rotate, while the outer ring would not rotate with the inner ring due to the rolling elements. Therefore, the outermost second wheel 3323 would not be affected by the innermost rotating second transmission shaft 341.

Figure 5:
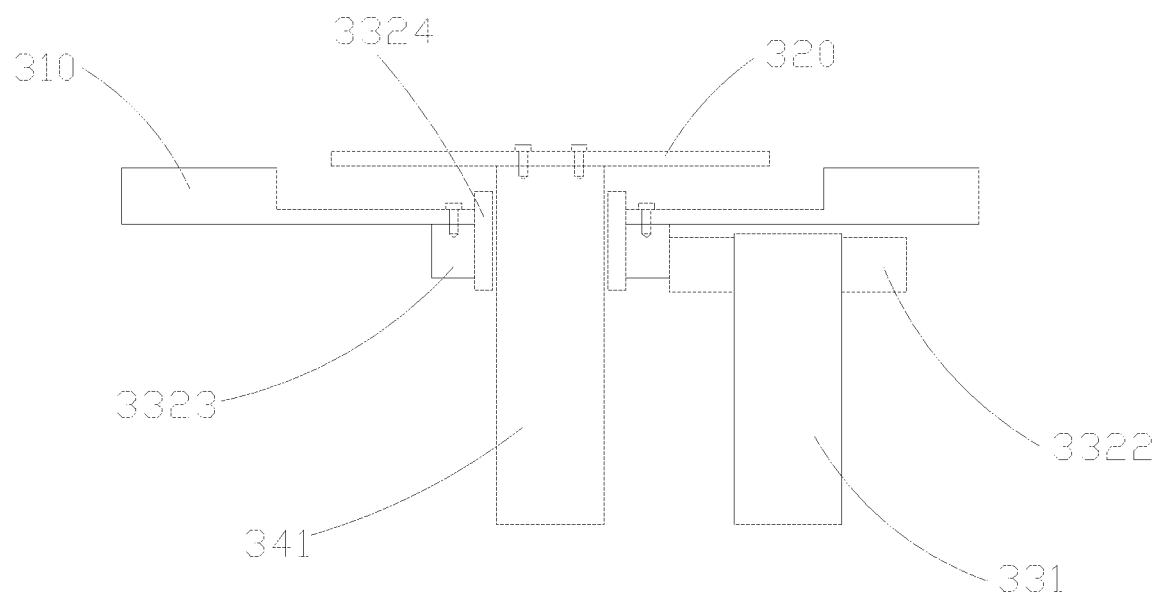
FIG. 5 is a schematic view of a first power output component and a second power output component for power output according to an embodiment of the present invention.

Referring to FIG. 5, in this embodiment, the first motor 3321 drives the first transmission shaft 331 to rotate, the first transmission shaft 331 drives the first wheel 3322 connected thereto to rotate, and the first wheel 3322 drives the second wheel 3323 to rotate. As the second wheel 3323 is fixedly connected to the turntable 310, the second wheel 3323 drives the turntable 310 to rotate. The second motor drives the second transmission shaft 341 to rotate, and the second transmission shaft 341 drives the first driving wheel 320 to rotate. During the rotation of the second wheel 3323, due to the bearing 3324, the first transmission shaft 331 located inside the bearing 3324 would not be affected by the rotating second wheel 3323. Also, during the rotation of the second transmission shaft 341, due to the bearing 3324, the second wheel 3323 located outside the bearing 3324 would not be affected by the rotating second transmission shaft 341. In other words, the first power output component 332 and the second power output component 342 can output power independently.

The turntable 310 is provided with at least one third fixing hole, and the second wheel 3323 is fixed on the turntable 310 by screw(s) or bolt(s) passing through the third fixing hole.

In this embodiment, the first wheel 3322 and the second wheel 3323 are both gears. Alternatively, both the first wheel 3322 and the second wheel 3323 are friction wheels.

It should be noted that an alternative of the above embodiment can be provided by interchanging the first power output component 332 and the second power output component 342. For example, in an alternative of the above embodiment, the first power output component 332 can include a first motor 3321 connected to the first transmission shaft 331, and the second power output component 342 can include a second motor connected to the second transmission shaft 341, a first wheel 3322 disposed on the second transmission shaft 341, a second wheel 3323 engaged with the first wheel 3322 and disposed on the first transmission shaft 331 through a bearing 3324, wherein the second wheel 3323 is fixedly connected to the first driving wheel 320.

The turntable 310 can be arranged inside or outside of the first driving wheel 320, with the rotation axes in the same line. Based on the above-mentioned designed arrangement of the first power output component 332 and the second power output component 342, the two power output components do not affect each other, and the turntable 310 and the first driving wheel 320 can be driven to rotate smoothly around the same centre line. In another aspect, due to the designed arrangement of the first power output component 332 and the second power output component 342, the turntable 310 can be arranged inside or outside of the first driving wheel 320, with the rotation axes thereof in the same line, avoiding a non-coaxial arrangement therebetween, thus greatly saving space, improving integration, and reducing the production cost of apparatus.

Figure 6:
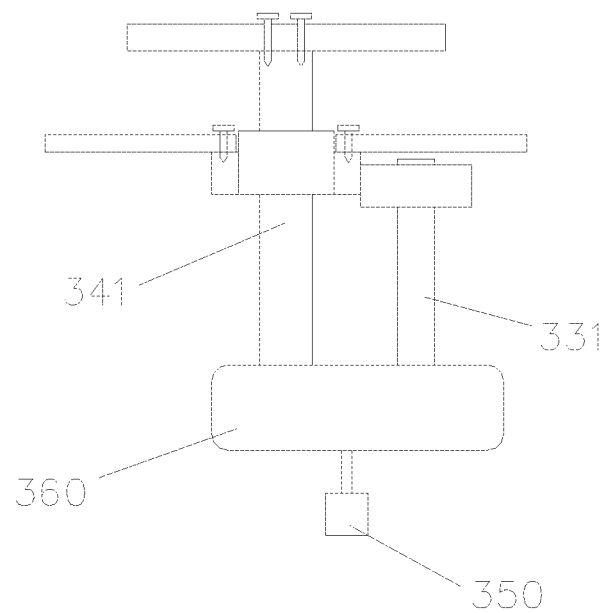
FIG. 6 is a schematic view of a first power output component and a second power output component sharing one motor according to an embodiment of the present invention.

Referring to FIG. 6, the first power output component 332 and the second power output component can share a single motor 350. The output shaft 351 of the motor 350 is connected to a steering mechanism 360 which is connected to the first transmission shaft 331 and the second transmission shaft 341, respectively. The motor 350 rotates forward and backward (or up and down), and the steering mechanism 360 drives the first transmission shaft 331 and the second transmission shaft 341 alternatively. For example, when the motor 350 rotates forward, the steering mechanism 360 drives the first transmission shaft 331 to rotate, the first transmission shaft 331 drives the first wheel 3322 connected thereto to rotate, and the first wheel 3322 drives the second wheel 3323 to rotate. As the second wheel 3323 is fixedly connected to the turntable 310, it will drive the turntable 310 to rotate. When the motor 350 rotates backward, the steering mechanism 360 drives the second transmission shaft 341 to rotate, and the second transmission shaft 341 drives the first driving wheel 320 to rotate.

Figure 7:
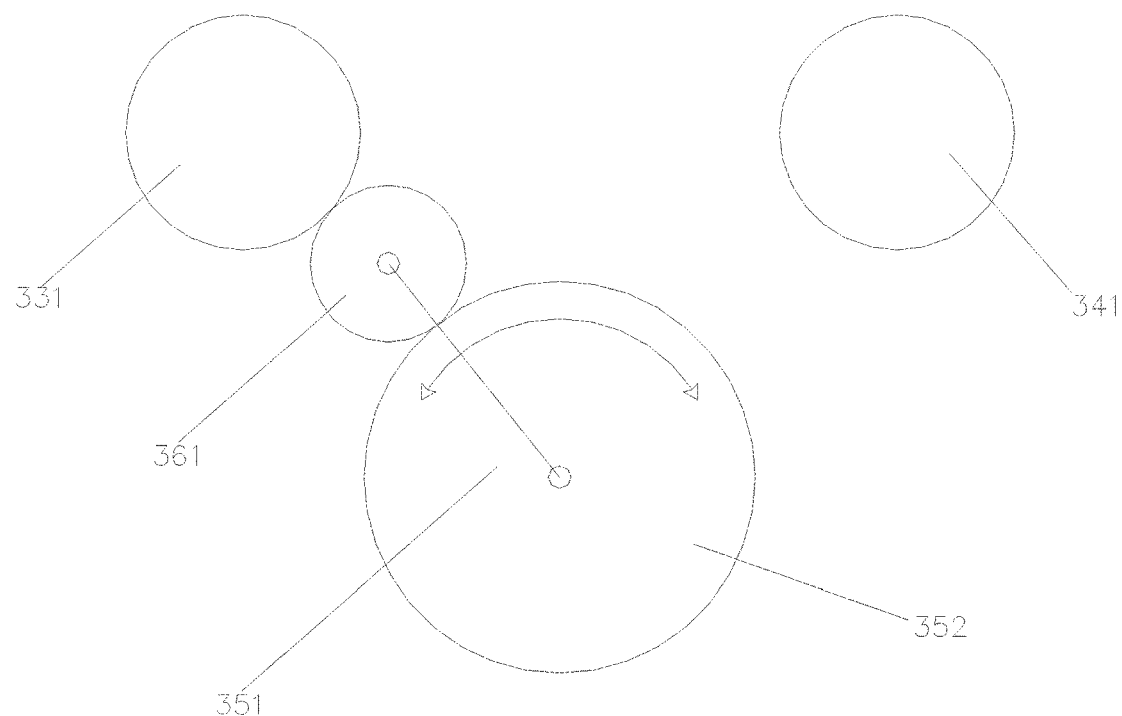
FIG. 7 is a schematic view of a steering mechanism according to an embodiment of the present invention.

Referring to FIG. 7, the steering mechanism 360 includes a steering gear 361 connected to the output shaft 351 of the motor 350. Driven by the output wheel 352 of the motor, the output shaft 351 rotates in the left direction as shown in FIG. 7. As the steering gear 361 is engaged with the first transmission shaft 331, the motor 350 can drive the first transmission shaft 331 to rotate. Driven by the output wheel 352 of the motor, the output shaft 351 rotates in the right direction as shown in FIG. 7. As the steering gear 361 is engaged with the second transmission shaft 341, the motor 350 can drive the second transmission shaft 341 to rotate.

Embodiment 5

Figure 8:
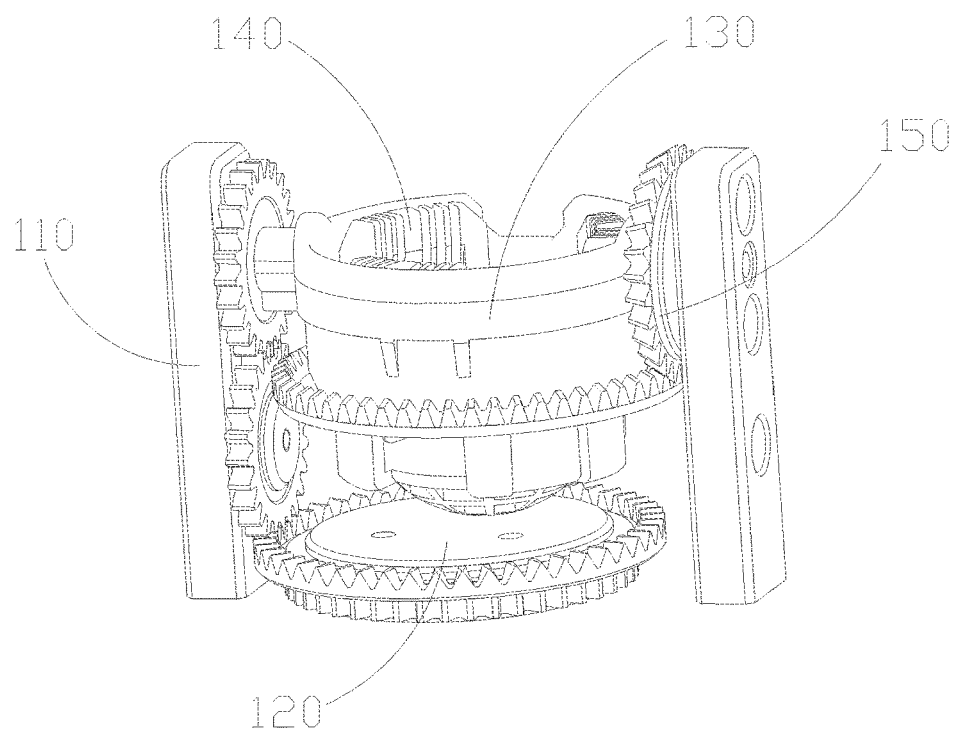
FIG. 8 is a schematic view of an object's motion attitude adjusting mechanism according to an embodiment of the present invention.
Figure 9:
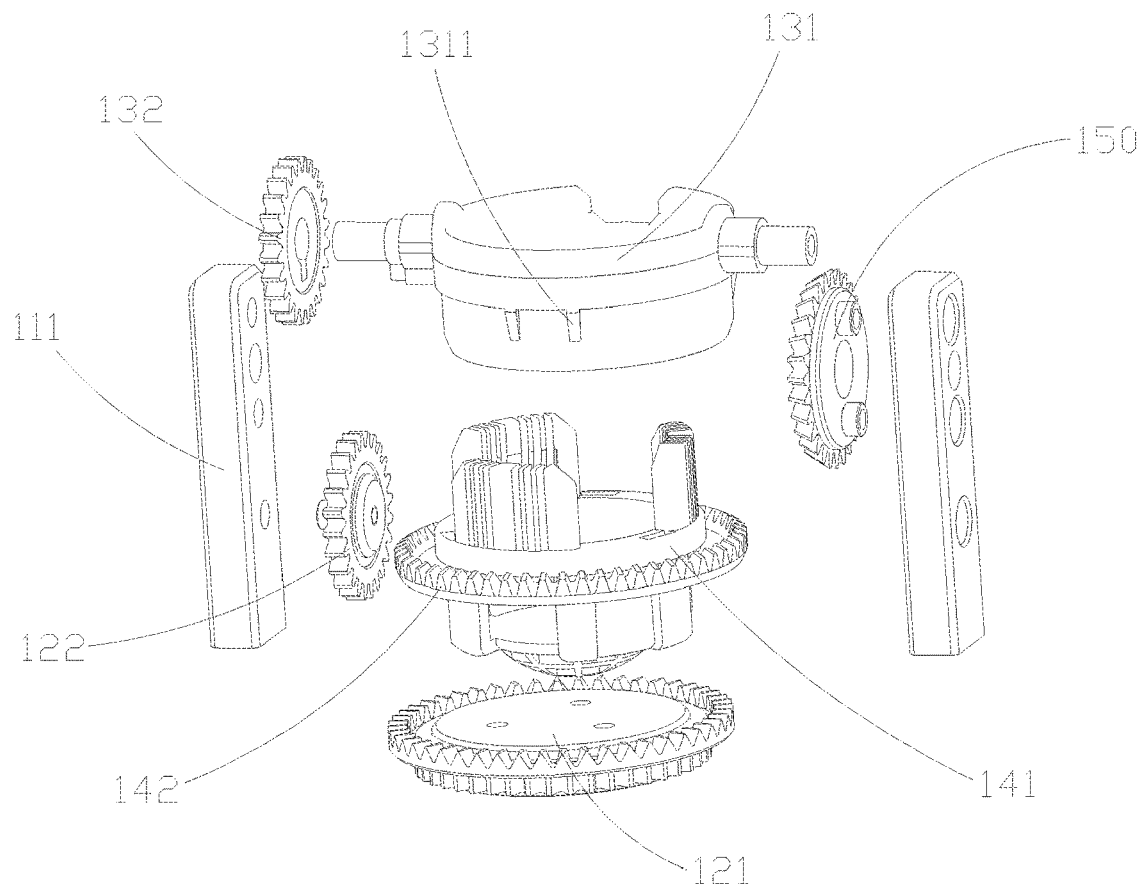
FIG. 9 is an exploded view of an object's motion attitude adjusting mechanism according to an embodiment of the present invention.

Referring to FIGS. 8 and 9, on the basis of the first embodiment, the object's motion attitude adjusting mechanism 100 of the fifth embodiment includes:
- a frame 110;
- a third driving component 120;
- a supporting component 130 disposed on the frame 110 and connected with the third driving component 120 in a transmission manner;
- an object carrier 140 disposed on the supporting component 130 and movable relative to the supporting component 130; and
- a fourth driving component 150 disposed on the frame 110 and connected with the object carrier 140 in a transmission manner.

When the third driving component 120 drives the supporting component 130 to swing or roll, the object carrier 140 swings or rolls with the supporting component 130 while being driven by the fourth driving component 150 to rotate.

The above-mentioned "in a transmission manner" refers to that the motion of one member can be transmitted to another member to change the motion of the other member. For example, the third driving component 120 being connected to the supporting component 130 in a transmission manner means that the motion of the third driving component 120 can be transmitted to the supporting component 130 to drive the supporting component 130 to move. In the present embodiment, the supporting component 130 is driven by the third driving component 120 to swing or roll. The fourth driving component 150 being connected to the object carrier 140 in a transmission manner means that the motion of the fourth driving component 150 can be transmitted to the object carrier 140 to drive the object carrier 140 to move. In the present embodiment, the object carrier 140 is driven by the fourth driving component 150 to rotate.

The above-mentioned "rotate" refers to that the object carrier 140 moves circumferentially about a central axis, which may be the central axis of the object carrier 140 itself or a central axis outside the object carrier 140, depending on the shape, number, and the like of the object carriers 140, and can be adjusted as required.

In the case where the object carrier 140 is loaded with only one object, the object carrier 140 is rotated about its own central axis. Rotating about the object's own central axis can maintain the movement stability of the object. In the case where a plurality of object carriers 140 are provided and loaded with a plurality of objects, for example, three object carriers 140 can be provided and loaded with three objects, with each object carrier being loaded with one object, an imaginary circle can be defined by connecting the object carriers 140, with the central axis passing through the centre thereof, about which the object carriers 140 are rotated. The object carriers 140 rotating about the central axis can maintain the movement stability and safety of the object's motion attitude adjusting mechanism 100 while simultaneously adjusting the motion attitudes of the objects.

It should be noted that when the object carrier(s) 140 is said to be loaded with a plurality of objects, a plurality of object carriers 140 may be provided, with each of the object carriers 140 being loaded with an object, or only one object carrier 140 may be provided, with a plurality of objects being loaded in the same object carrier 140 simultaneously. Further, the object carrier 140 may rotate by a complete circle, or by an incomplete circle. For example, the object carrier 140 may rotate back and forth only along a semi-circle.

The supporting component 130 and the fourth driving component 150 are disposed on the frame 110 which supports the supporting component 130 and the fourth driving component 150. The object carrier 140 is disposed on the supporting component 130, so the frame 110 also supports the object carrier 140. Further, the third driving component 120 can be separately provided, without providing on the frame 110, and connected with the supporting component 130 in a transmission manner. Alternatively, the third driving component 120 can be provided on the frame 110, and connected with the supporting component 130 in a transmission manner.

In this embodiment, the motion attitude adjusting process of the object's motion attitude adjusting mechanism 100 is as follows:

The third driving component 120 drives the supporting component 130 to swing or roll. The object carrier 140 is disposed on the supporting component 130, so the supporting component 130 drives the object carrier 140 to swing or roll. The fourth driving component 150 drives the object carrier 140 to rotate while the object carrier 140 swings or rolls.

Specifically, if the supporting component 130 swings, the third driving component 120 drives the supporting component 130 to swing, and the supporting component 130 drives the object carrier 140 to swing, while the fourth driving component 150 drives the object carrier 140 to rotate, wherein the object carrier 140 does not rotate along a complete circle, but only rotates back and forth along a semi-circle. If the supporting component 130 rolls, the third driving component 120 drives the supporting component 130 to roll, and the supporting component 130 drives the object carrier 140 to roll, while the fourth driving component 150 drives the object carrier 140 to rotate, wherein the object carrier 140 rotates in a complete circle.

As an example, the axis about which the supporting component 130 swings or rolls coincides with the axis about which the object carrier 140 rolls.

It should be noted that, when the third driving component 120 operates, the supporting component 130 is driven to swing or roll. Due to the movement of the supporting component 130, the fourth driving component 150 can be allowed to drive the object carrier 140 to rotate. Although the object carrier 140 is disposed on the supporting component 130, the object carrier 140 can rotate independently from the supporting component 130.

The object carrier 140 can be provided with a limiting slot in which the object can be locked. The object would not fall off from the limiting slot during movement and can move along with the object carrier 140. Alternatively, the object carrier 140 can be provided with a clamping mechanism consisting of a plurality of clamping members. When the object is received in the object carrier 140, the clamping members of the clamping mechanism can clamp the object. The object would not fall off from the clamping mechanism either and can move along with the object carrier 140. The clamping mechanism is adaptable to various objects with different sizes and shapes, thereby broadening the applications of the object carrier 140.

During the operation of the object's motion attitude adjusting mechanism 100, the object can be placed on the object carrier 140 manually or mechanically, the third driving component 120 drives the supporting component 130 to swing or roll, and the object carrier 140 swings or rolls along with the supporting component 130 while rotating as being driven by the fourth driving component 150. The object, which is fixed on the object carrier 140, also swings or rolls and simultaneously rotates along with the object carrier 140. The object's motion attitude adjusting mechanism 100 can drive the object to assume multiple motion attitudes, and can bring the object with desired motion attitudes, thereby broadening the applications. In toy applications, for example, the object's motion attitude adjusting mechanism 100 can drive the toys or the ornaments to swing or roll and to rotate at the same time, instead of in a single, dull motion mode. In amusement facilities, the object's motion attitude adjusting mechanism 100 can drive the players to swing or roll and to rotate at the same time, bringing the players extremely exciting experiences. In automatic cookers, the object's motion attitude adjusting mechanism 100 can drive the cooking vessels to swing or roll and to rotate at the same time, in order to fully mix the food material, bringing better taste. In chemical mixing application, the object's motion attitude adjusting mechanism 100 can drive the container to swing or roll and to rotate at the same time, mixing the different chemicals in the container more uniformly.

In other embodiments, the object's motion attitude adjusting mechanism 100 can also be applied in other applications, for example, a product display table, a dice shaking device and the like, which will not be described herein.

Embodiment 6

Referring to FIG. 9, on the basis of the fifth embodiment, the object carrier 140 of the sixth embodiment includes:
an object carrying portion 141, and
a first driven wheel 142 disposed on the object carrying portion 141 and connected to the fourth driving component 150 in a transmission manner.

The object carrying portion 141 is provided with at least one object receiving space.

Figure 10:
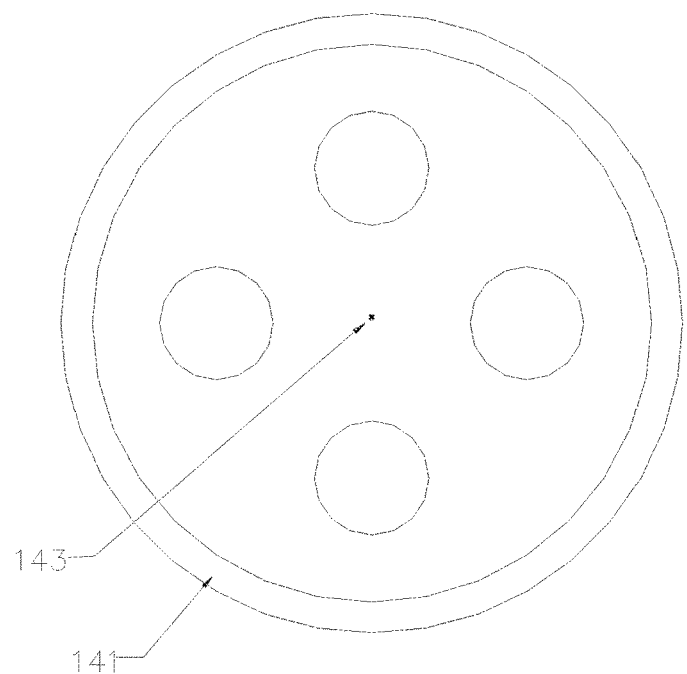
FIG. 10 is a schematic view of an object carrying portion provided with a plurality of object receiving spaces according to an embodiment of the present invention.

The object receiving space defined in the object carrying portion 141 can carry object. In the case where the object carrying portion 141 is provided with only one object receiving space, at least one object can be loaded therein, and the object carrying portion 141 rotates about its own central axis. Referring to FIG. 10, in the case where the object carrying portion 141 is provided with a plurality of object receiving spaces, a plurality of objects can be loaded therein. For example, three objects can be loaded and evenly spaced each other. The object carrying portion 141 rotates about its own central axis 143.

When the object is fixedly disposed on the object carrying portion 141, the fourth driving component 150 can drive the first driven wheel 142 to rotate, the first driven wheel 142, which is disposed on the object carrying portion 141, can in turn drive the object carrying portion 141 to rotate, and the object carrying portion 141, which carries the object, can thus drive the object to rotate.

The object carrying portion 141 can be provided with a limiting slot in which the object can be locked. The object would not fall off from the limiting slot during movement and can move along with the object carrying portion 141. Alternatively, the object carrying portion 141 can be provided with a clamping mechanism consisting of a plurality of clamping members. When the object is received in the object carrying portion 141, the clamping members of the clamping mechanism can clamp the object. The object would not fall off from the clamping mechanism either and can move along with the object carrying portion 141. The clamping mechanism is adaptable to various objects with different sizes and shapes, thereby broadening the applications of the object carrying portion 141.

Figure 11:
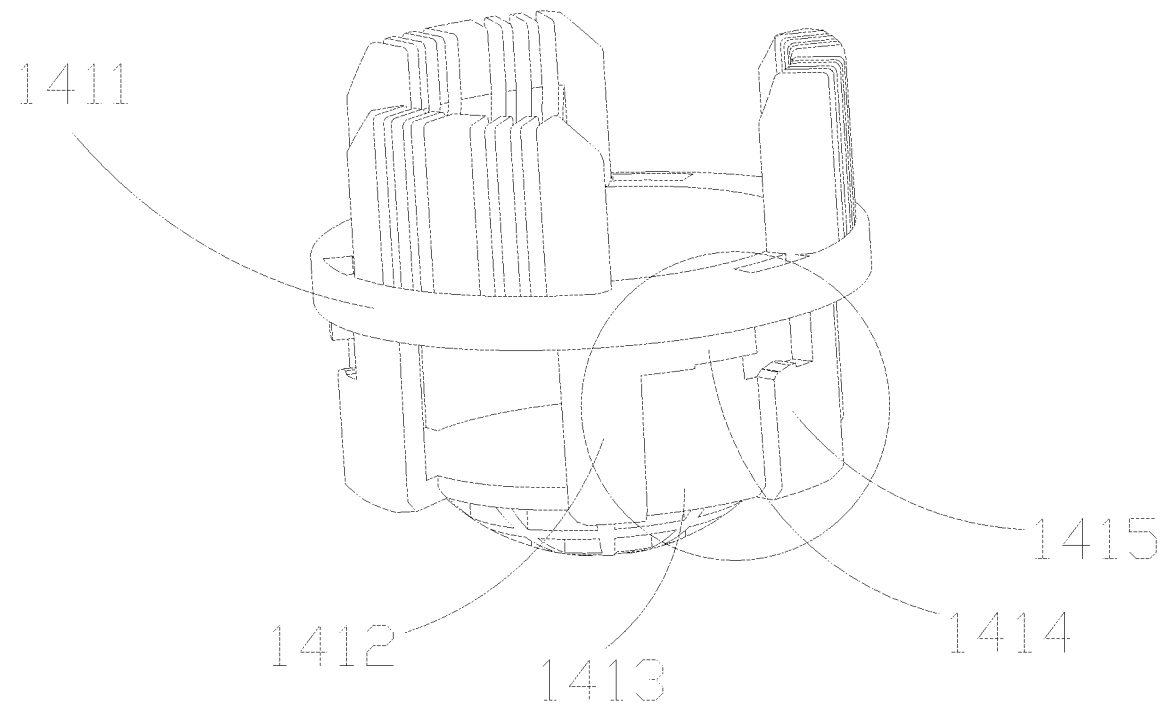
FIG. 11 is a schematic view of an object carrying portion according to an embodiment of the present invention.
Figure 13:
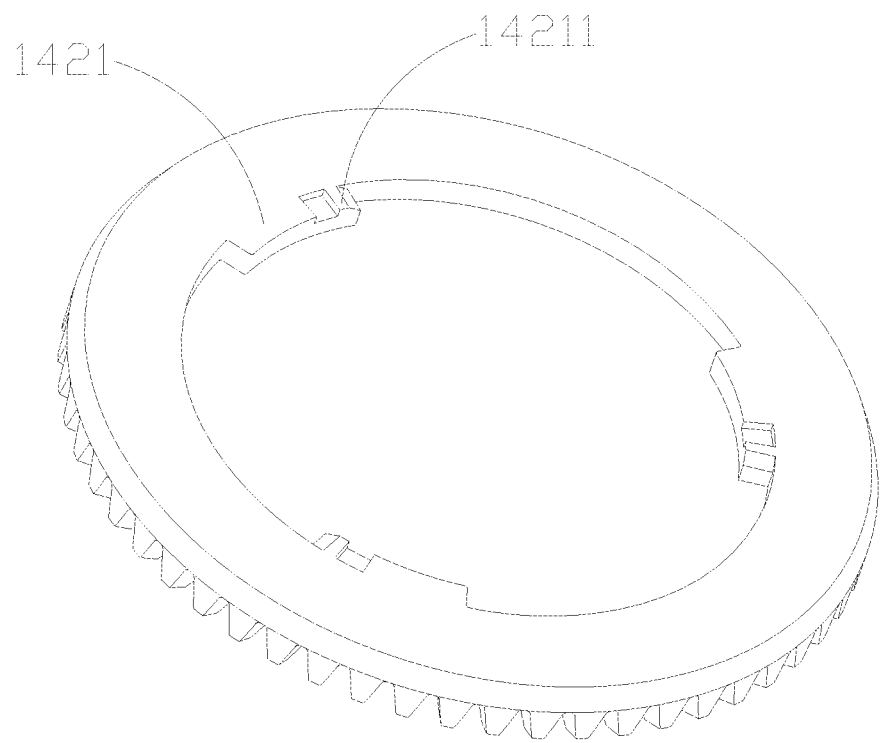
FIG. 13 is a schematic view of a first driven wheel according to an embodiment of the present invention.

Referring to FIG. 11, in the present embodiment, the object carrying portion 141 is provided with a peripheral platform 1411 and protruding platforms 1412 fixedly connected to the peripheral platform 1411, with locking grooves 1413 defined between the peripheral platform 1411 and the protruding platforms 1412. Referring to FIG. 13, the first driven wheel 142 is provided with locking latches 1421 protruding inwardly. The locking latches 1421 are snapped into the locking grooves 1413 until the locking latches 1421 abut against the peripheral platform 1411, thereby assembling the object carrying portion 141 and the first driven wheel 142. The length of the locking latch 1421 corresponds to the length of the locking groove 1413, so that the object carrying portion and the first driven wheel 142 can be fixed to each other, preventing the first driven wheel 142 from separating from the object carrying portion 141 in the subsequent movement.

Six protruding platforms 1412 are provided, and three locking grooves 1413 are defined, with each locking groove 1413 defined between two protruding platforms 1412. The first driven wheel 142 is provided with three locking latches 1421 engaging with the locking grooves 1413. The first driven wheel 142 can be firmly fixed to the object carrying portion by the engagement between the locking latches 1421 and the locking grooves 1413.

Figure 14:
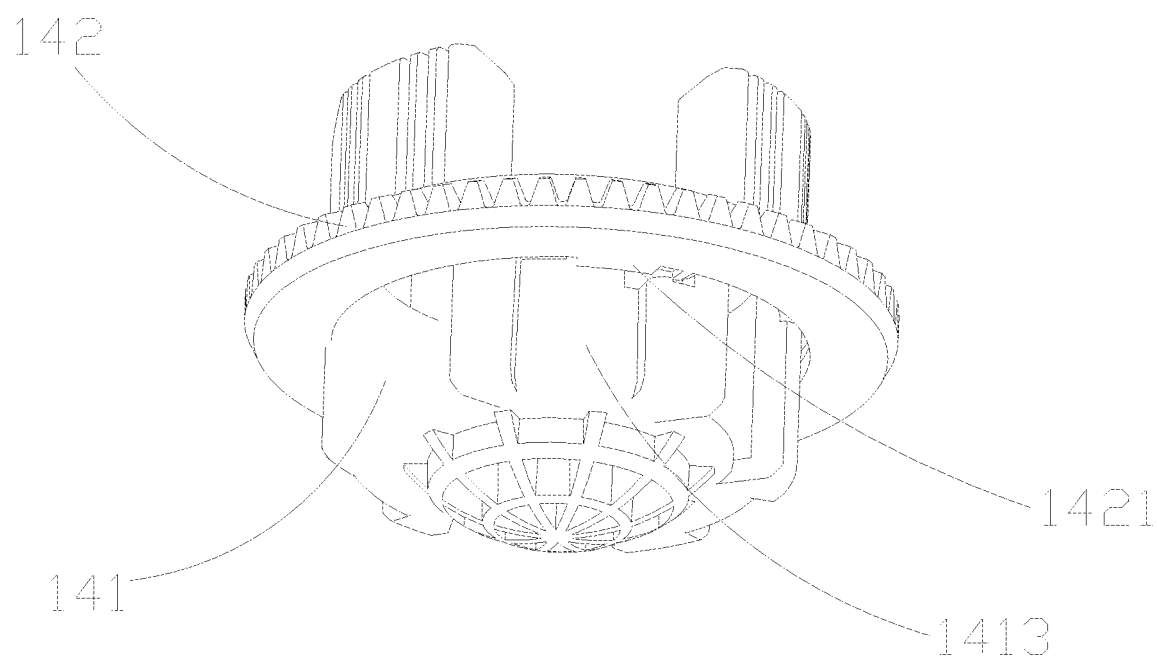
FIG. 14 is a schematic view of an object carrying portion and a first driven wheel assembled together according to an embodiment of the present invention.

Referring to FIG. 11, further, the protruding platform 1412 of the object carrying portion 141 is fixedly connected with a protrusion 1414. During assembly, the locking latch 1421 of the first driven wheel 142 is snapped into the locking groove 1413 of the object carrying portion 141, when the first driven wheel 142 comes into contact with the protrusion 1414, the first driven wheel 142 is rotated by a certain angle, and the first driven wheel 142 is further snapped into the object carrying portion 141, until the locking latch 1421 abuts against the peripheral platform 1411. Another protruding platform 1412 adjacent to the protruding platform 1412 provided with the projection 1414 is fixedly connected with a guide platform 1415. When the first driven wheel 142 contacts the projection 1414, the guide platform 1415 can guide the first driven wheel 142 to rotate, preventing a rotation deviation of the first driven wheel 142, and ensuring a smooth snapping of the first driven wheel 142 into the locking groove 1413. FIG. 14 is a schematic view in which the object carrying portion 141 and the first driven wheel 142 are assembled together. By means of the projection 1414 and the guide platform 1415, the operator can assemble the object carrying portion 141 and the first driven wheel 142 more easily.

Figure 12:
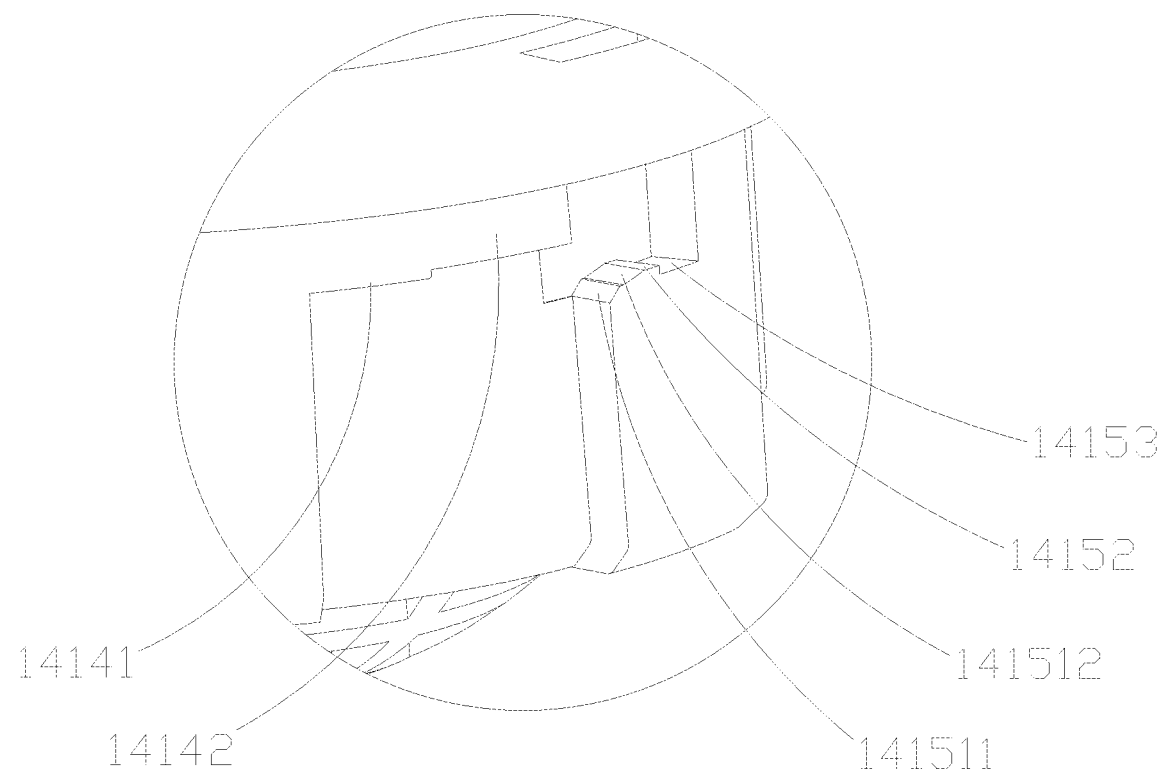
FIG. 12 is a partially enlarged view of FIG. 11.

Referring to FIGS. 11 and 12, further, the protrusion 1414 includes a first stepped protrusion 14141 and a second stepped protrusion 14142 fixedly connected to the first stepped protrusion 14141. The first stepped protrusion 14141 has a higher height than the second stepped protrusion 14142. When the locking latch 1421 of the first driven wheel 142 is snapped into the locking groove of the object carrying portion, the locking latch 1421 firstly contacts the surface of the first stepped protrusion 14141, and then the locking latch 1421 is rotated, until being inserted into and contacts the surface of the second stepped protrusion 14142. The guide platform 1415 is provided with a rotation transition portion, a stopper portion 14152, and a first radial positioning portion 14153. Referring to FIG. 13, the locking latch 1421 is provided with a second radial positioning portion 14211 engaging with the first radial positioning portion 14153. The rotation transition portion is provided with a transition angle. When rotating the locking latch 1421, the locking latch 1421 moves along the rotation transition portion which facilitates the rotation of the locking latch 1421, and the second radial positioning portion 14211 is engaged with the first radial positioning portion 14153, until the locking latch 1421 is locked by the stopper portion 14152 which prevents the locking latch 1421 from being disengaged.

The distance between adjacent surfaces of the protrusion 1414 and the guide platform 1415 is slightly greater than the width of the locking latch 1421, facilitating the snapping of the locking latch 1421. As shown in FIG. 12, the distance between the right surface of the first stepped protrusion 14141 and the left surface of the protruding platform 1412 at the right side of the first stepped protrusion 14141 corresponds to the width of the locking latch 1421, and the vertical distance between the lower surface of the second stepped protrusion 14142 and the upper surface of the stopper portion 14152 corresponds to the height of the locking latch 1421, further facilitating the snapping of the locking latch 1421, as well as the positioning of the locking latch 1421.

The rotation transition portion includes a first stepped rotation transition portion 141511 and a second stepped rotation transition portion 141512. The transition angles of the first stepped rotation transition portion 141511 and the second stepped rotation transition portion 141512 are different, so as to adapt to different rotation states of the locking latch 1421, further facilitate the snapping of the locking latch 1421 and reduce the difficulty of assembling the object carrying portion 141 and the first driven wheel 142142.

In other embodiments, the object carrying portion 141 and the first driven wheel 142 can be fixedly connected with each other in one piece. One piece means a single processing without secondary processing, and that the object carrying portion 141 and the first driven wheel 142 are fixedly installed during the processing, without subsequent manual assembly. If the object carrying portion 141 and the first driven wheel 142 are formed in one piece, there is no need for the object carrying portion 141 and the first driven wheel 142 to be fixed by engaging a plurality of members, and the object carrying portion 141 and the first driven wheel 142 can be stably fixed with each other in one piece during the processing.

Embodiment 7

Referring to FIG. 9, on the basis of the sixth embodiment, the fourth driving component 150 of the seventh embodiment is a second driving wheel 151 connected with the first driven wheel 142 in a transmission manner.

When the third driving component 120 drives the supporting component 130 to swing or roll, the second driving wheel 151 provides power for the first driven wheel 142 to drive the first driven wheel 142 to rotate. The first driven wheel 142 which is disposed on the object carrying portion 141, thus can drive the object carrying portion 141 to rotate.

Figure 15:
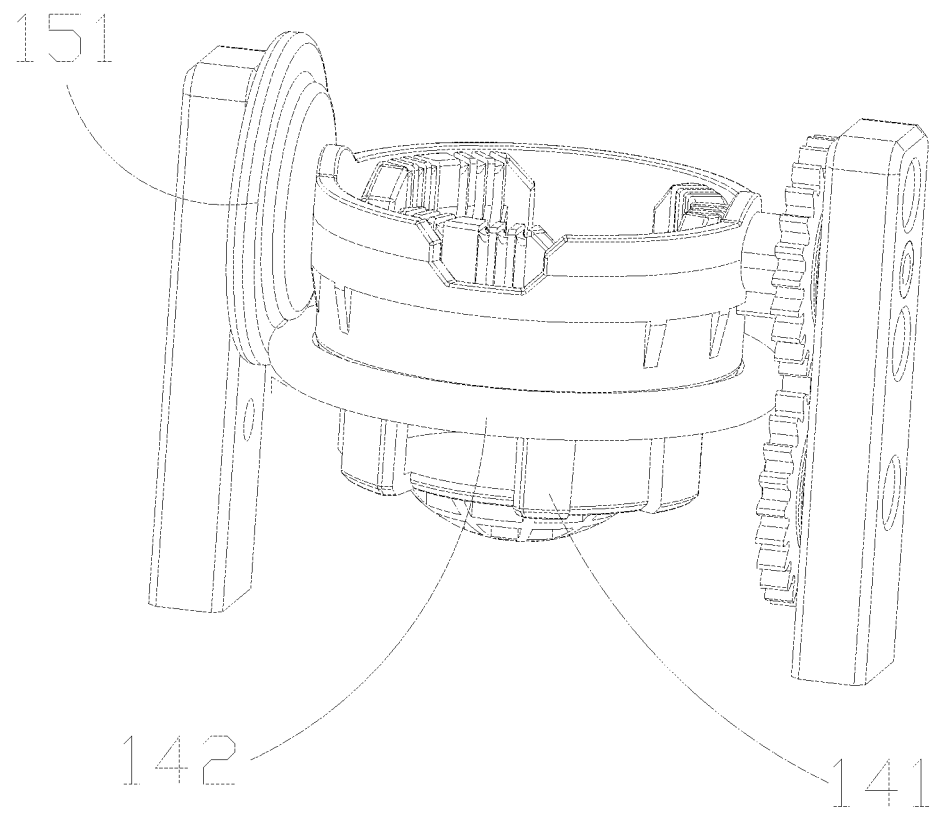
FIG. 15 is a schematic view of an object's motion attitude adjusting mechanism according to an embodiment of the present invention in which the second driving wheel and the first driven wheel are friction wheels.

Here, the first driven wheel 142 and the second driving wheel 151 can be wheels that mesh with each other as shown in FIGS. 8 and 9, or friction wheels that can be driven by friction force as shown in FIG. 15.

In the case where the first driven wheel 142 and the second driving wheel 151 are wheels that mesh with each other, the first driven wheel 142 and the second driving wheel 151 are both gears. Through the meshing engagement, the second driving wheel 151 can drive the first driven wheel 142 to rotate, so that the first driven wheel 142 can drive the object carrying portion 141 to rotate.

In the case where the first driven wheel 142 and the second driving wheel 151 are friction wheels that can be driven by friction force, the first driven wheel 142 and the second driving wheel 151 directly contact with and abut against each other. A friction force is generated between the second driving wheel 151 and the first driven wheel 142, thereby transmitting power, so that the first driven wheel 142 can rotate, and thus the first driven wheel 142 can drive the object carrying portion 141 to rotate.

Embodiment 8

Referring to FIG. 9, on the basis of the seventh embodiment, the second driving wheel 151 of the eighth embodiment is a static wheel, and the static wheel is fixed on the frame 110.

The axial direction of the stationary wheel and the axial direction of the first driven wheel 142 are perpendicular to each other.

The frame 110 is provided with at least one first fixing hole, and the static wheel is fixed on the frame 110 by screw(s) or bolt(s) passing through the first fixing hole.

When the third driving component 120 drives the supporting component 130 to swing or roll, the static wheel does not rotate, and the object carrier 140 swings or rolls along with the supporting component 130. The first driven wheel 142 is meshed with the static wheel. Since the static wheel does not rotate, the first driven wheel 142 swings or rolls, and also rotates under the force of the static wheel, so that the first driven wheel can drive the object carrying portion 141 to rotate.

In this embodiment, referring to FIG. 8, the static wheel can be a static gear. Alternatively, referring to FIG. 15, the static wheel can be a static friction wheel.

Embodiment 9

Referring to FIG. 9, on the basis of the sixth embodiment, the supporting component 130 of the ninth embodiment includes:

a supporter 131 rotatably assembled with the object carrying portion 141 for driving the object carrying portion 141 to swing or roll, and a second driven wheel 132 disposed on the supporter 131 and connected with the third driving component 120 in a transmission manner.

Figure 16:
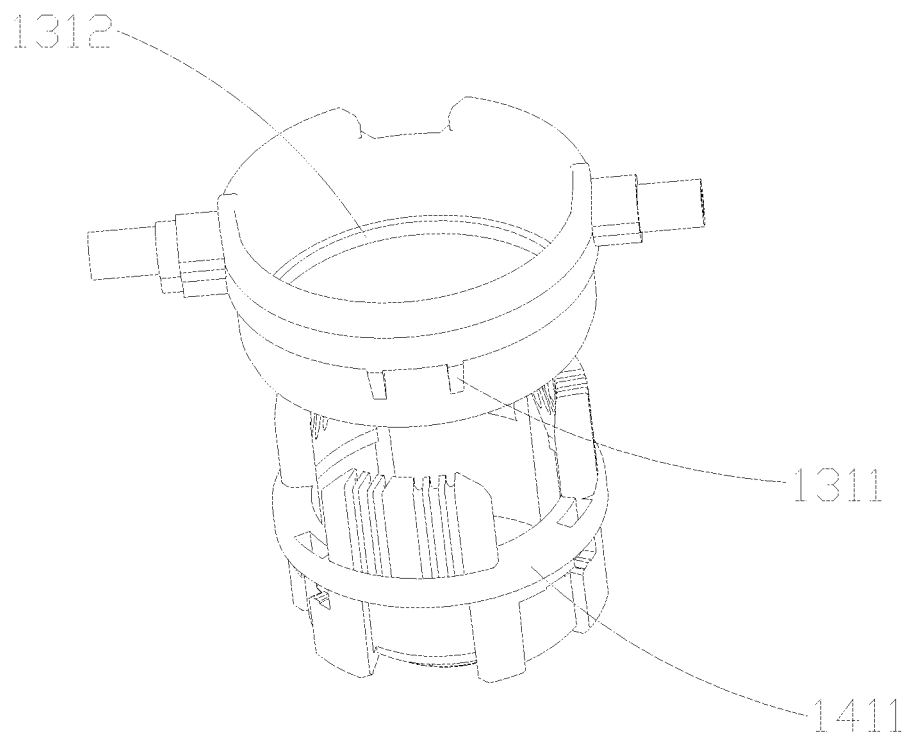
FIG. 16 is a schematic view of an object carrying portion separated from a supporter according to an embodiment of the present invention.

Referring to FIGS. 9 and 16, the supporter 131 is provided with a plurality of ribs 1311 which can be disposed on the outer surface of the supporter 131. By providing the ribs 1311, the strength of the supporter 131 can be enhanced, avoiding a deformation of the supporter 131 after a plurality of swinging or rolling motions.

The second driven wheel 132 is disposed on the frame 110, and is fixedly connected with the supporter 131 through fixing shaft (s). When the second driven wheel 132 rotates, the second driven wheel 132 drives the supporter 131 to swing or roll.

When the third driving component 120 works, the third driving component 120 drives the second driven wheel 132 to rotate. As the second driven wheel 132 is fixedly connected with the supporter 131, the second driven wheel 132 drives the supporter 131 to swing or roll, so that the supporter 131 drives the object carrying portion 141 to swing or roll.

The axis direction of the second driven wheel 132 is consistent with the axis direction of the static wheel of the eighth embodiment, and is horizontal to ground, so that the supporting component 130 can swing or roll stably, without deviation during the swinging or rolling movement.

In the present embodiment, when the driving wheel of the third driving component 120 in contact with the second driven wheel 132 is a gear, the second driven wheel 132 is also a gear. It can also be conceived that when the driving wheel of the third driving component 120 in contact with the second driven wheel 132 is a friction wheel, the second driven wheel 132 is also a friction wheel.

Embodiment 10

On the basis of the ninth embodiment, the second driven wheel 132 of the tenth embodiment is a gear, and the rotational angular velocity ratio between the second driven wheel 132 and the turntable 310 is in a multiple relationship with the number of the object's motion attitude adjusting devices 200.

When the object's motion attitude adjusting device 200 moves circumferentially around the axis of the turntable 310, the object's motion attitude adjusting mechanism 100 also adjusts its motion attitude synchronously, for example, by rolling as described in the fifth embodiment. As the second driven wheel 132 controls the rolling angle of the supporting component 130, i.e., the object carrier 140, and the turntable 310 controls the rotation angle of the object's motion attitude adjusting device 200, by setting the rotational angular velocity ratio between the second driven wheel 132 and the turntable 310 in a multiple relationship with the number of the object's motion attitude adjusting devices 200, the second driven wheel 132 can be rolled one circle by controlling the object's motion attitude adjusting device 200 to rotate at a certain angle. Therefore, the opening of the object carrier 140 can face upward again as the object's motion attitude adjusting device 200 rotates a certain angle.

For example, if six object's motion attitude adjusting devices 200 are provided, the rotation angle of the turntable 310 is 360/6=60 degrees every time. As the turntable 310 rotates 60 degrees every time, the second driven wheel 132 rotates 360 degrees, and the object carrier 140 rolls one circle, so that the opening of the object carrier 140 will face upward again.

If the object's motion attitude adjusting apparatus 300 is applied to the puncturing, liquid filling and mixing system, the above arrangement thereof can accurately control the opening of the object carrier 140 to face upward when the object's motion attitude adjusting mechanism 100 moves to a specific position.

Embodiment 11

On the basis of the ninth embodiment, the second driven wheel 132 and the first driving wheel 320 of the eleventh embodiment are both gears, and the rotational angular velocity ratio between the second driven wheel 132 and the first driving wheel 320 is in a multiple relationship with the number of the object's motion attitude adjusting mechanisms 100.

When the object's motion attitude adjusting mechanism 100 moves circumferentially around the axis of the base, the object's motion attitude adjusting mechanism 100 also adjusts its motion attitude synchronously, for example, by rolling as described in the fifth embodiment. As the second driven wheel 132 controls the rolling angle of the supporting component 130, i.e., the object carrier 140, and the first driving wheel 320 controls the rotation angle of the object's motion attitude adjusting mechanism 100, by setting the rotational angular velocity ratio between the second driven wheel 132 and the first driving wheel 320 in a multiple relationship with the number of the object's motion attitude adjusting mechanisms 100, the second driven wheel 132 can be rolled one circle by controlling the first driving wheel 320 to rotate at a certain angle. Therefore, the opening of the object carrier 140 can face upward again as the first driving wheel 320 rotates a certain angle.

For example, if three object's motion attitude adjusting mechanisms 100 are provided, the rotation angle of the first driving wheel 320 is 360/3=120 degrees every time. As the first driving wheel 320 rotates 120 degrees every time, the second driven wheel 132 rotates 360 degrees, and the object carrier 140 rolls one circle, so that the opening of the object carrier 140 will face upward again.

If the object's motion attitude adjusting apparatus 300 is applied to the puncturing, liquid filling and mixing system, the above arrangement thereof can accurately control the opening of the object carrier 140 to face upward when the object's motion attitude adjusting mechanism 100 moves to the puncturing and liquid filling position, so that the puncturing module can puncture the object and the liquid filling module can fill liquid into the object.

In combination with the tenth embodiment and the eleventh embodiment, first, the turntable 310 is rotated to drive the object's motion attitude adjusting device 200 to move to a specific position, in which the opening of the object carrier 140 faces upward, and then the first driving wheel 320 rotates, the object's motion attitude adjusting mechanism 100 moves circumferentially around the axis of the base to the puncturing and liquid filling position, in which the opening of the object carrier 140 still faces upward, so that the puncturing module can puncture the object and the liquid filling module can fill liquid into the object.

Embodiment 12

Referring to FIGS. 8 and 9, on the basis of the ninth embodiment, the first driven wheel 142 of the twelfth embodiment is fixedly fitted to the outer periphery of the object carrying portion 141.

The object carrying portion 141 is surrounded by the roller, and is limited by and rotatably engaged with the roller.

The third driving component 120 drives the supporter 131 to roll, and the supporter 131 drives the object carrying portion 141 to roll. At the same time, the fourth driving component 150 drives the object carrying portion 141 to rotate about the central axis.

It should be noted that the first driven wheel 142, which is fixed to the outer periphery of the object carrying portion 141, will drive the object carrying portion 141 to rotate when rotating, while the object carrying portion 141, although it is surrounded by the supporter 131, but is not fixed with the supporter 131, can rotate relative to the supporter 131.

Referring to FIG. 16, the supporter 131 is provided with a flange 1312 protruding inward for engaging with the peripheral platform 1411 of the object carrying portion 141.

During assembly, the object carrying portion 141 is first inserted into the supporter 131 from the top to the bottom, and when the peripheral platform 1411 of the object carrying portion 141 abuts on the flange 1312 of the supporter 131, the object carrying portion 141 is prevented by the flange 1312 from being further inserted into the supporter 131. Then, the locking latch 1421 of the first driven wheel 142 is inserted into the locking groove 1413 of the cylindrical structure from the bottom to the top to fix the first driven wheel 142 to the object carrying portion 141.

The supporter 131, the object carrying portion 141, and the first driven wheel 142 cooperate with each other closely, wherein the object carrying portion 141 is restrained downward by the supporter 131 and upward by the first driven wheel 142, so that the object carrying portion 141 cannot fall off from the supporter 131 during movement. By means of this arrangement, the object carrying portion 141 is inserted in the supporter 131, and can also rotate relative to the supporter 131.

In the present embodiment, the object carrying portion 141 has a cylindrical structure. When the object carrying portion 141 rotates with the first driven wheel 142, the object carrying portion 141 rotates around the central axis of the cylindrical structure. The object carrying portion 141 can alternatively have other shapes, such as cone shape, sector shape, cylinder shape, etc., provided that the object carrying portion 141 can carry the object and rotate with the first driven wheel 142.

Embodiment 13

Referring to FIG. 8 and FIG. 9, on the basis of the fifth embodiment, the frame 110 of the thirteenth embodiment includes:
two support columns 111; and
a supporting component 130 connected to the two support columns 111 through shafts.

In this embodiment, the two support columns 111 are opposed to each other, and both support columns 111 are perpendicular to the placement plane (e.g., ground).

The frame 110 can further include a base plate. The support columns 111 are fixed on the base plate, and the base plate can support the support columns 111. The supporting component 130 is disposed on the support columns 111, and the support columns 111 can support the supporting component 130.

The support column 111 is made of a steel material, such as aluminum alloy, which has a high hardness and a long service life.

Each of the two support columns 111 is provided with a through hole, and the supporting component 130 is connected with the through holes of the support columns 111 through fixing shafts. The fixing shafts, driven by the third driving component 120, can rotate in the through holes, so that the supporting component 130 can swing or roll.

The shafts connecting the supporting component 130 are arranged horizontally to the ground. Driven by the third driving component 120, the supporting component 130 swings or rolls around the shafts without deviation.

Embodiment 14

Figure 17:
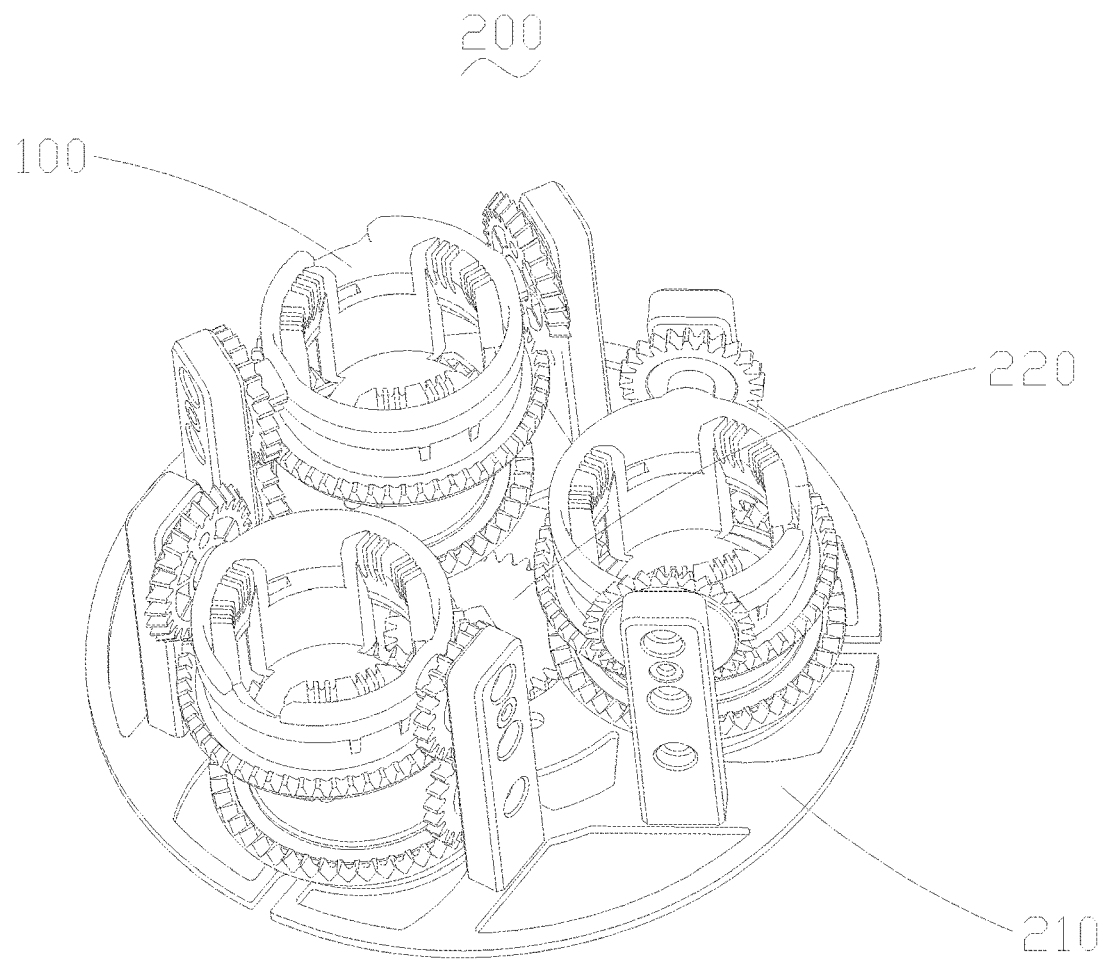
FIG. 17 is a schematic view of an object's motion attitude adjusting device according to an embodiment of the present invention.

Referring to FIG. 17, on the basis of the fifth embodiment, the object's motion attitude adjusting device 200 of the fourteenth embodiment further includes:
a fifth driving component 220 disposed on the base 210 and connected with the third driving component 120 of each of the object's motion attitude adjusting mechanisms 100 in a transmission manner, and
a third driven wheel fixed under the base 210 and connected with the first driving wheel 320 in a transmission manner;

The first driving wheel 320 drives the third driven wheel to rotate, thereby driving the fifth driving component 220 to operate. The fifth driving component 220 drives the third driving components 120 to operate simultaneously or sequentially. The third driving component 120 drives the supporting component 130 of the respective object's motion attitude adjusting mechanism 100 to swing or roll, and drives the respective object carrier 140 to rotate while swinging or rolling along with the respective supporting component 130.

The object's motion attitude adjusting mechanisms 100 and the fifth driving component 220 are disposed on the base 210, and are supported by the base 210.

Figure 18:
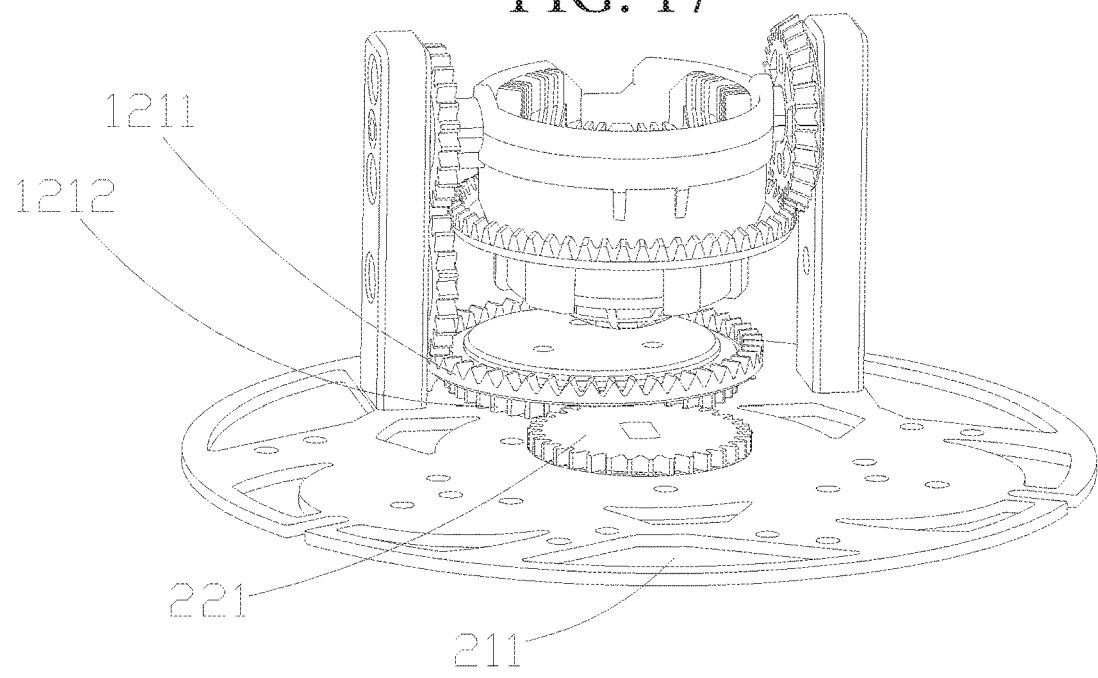
FIG. 18 is a schematic view of an object's motion attitude adjusting device without showing the other two object's motion attitude adjusting mechanisms according to an embodiment of the present invention.

The base 210 is made of a steel material, such as stainless steel, which has a high hardness and a long service life. Referring to FIG. 18, the base 210 is provided with a plurality of hollowed-out portions 211. By providing the hollowed-out portions 211, the weight of the base 210 is reduced while ensuring the hardness of the base 210, and the production cost of the base 210 is reduced.

In this embodiment, three object's motion attitude adjusting mechanisms 100 are provided. When the fifth driving component 220 operates, it drives the third driving components 120 of the three object's motion attitude adjusting mechanisms 100 to operate simultaneously or sequentially. Driven by the third driving component 120, the respective supporting component 130 corresponding to the third driving component 120 swings or rolls, and the respective supporting component 130 drives the object carrier 140 to swing or roll. Driven by the fourth driving component 150, the object carrier 140 is simultaneously rotated. Alternatively, another number of the object's motion attitude adjusting mechanisms 100 can also be provided, for example, four, five, etc., which will not be described in detail here.

In this embodiment, the third driven wheel is fixedly disposed on the base 210. When the first driving wheel 320 rotates, it drives the third driven wheel to rotate, and the third driven wheel drives the base 210 to rotate. The base 210 is provided with at least one second fixing hole, and the third driven wheel is fixed on the base 210 by screw(s) or bolt(s) passing through the second fixing hole.

When the first driving component 330 operates, the turntable 310, driven by the first driving component 330, rotates around the axis, and drives the object's motion attitude adjusting devices 200 to move around the axis of the turntable 310, so as to adjust the positions of the specific object's motion attitude adjusting devices 200. The first driving wheel 320 drives the respective third driven wheels to rotate, thereby driving the respective fifth driving components 220 to work. The supporting components 130 of the respective object's motion attitude adjusting device 200 are driven by the respective third driving component 120 to swing or roll simultaneously or sequentially. The object carriers 140 swings or rolls along with the respective supporting components 130 and rotate simultaneously or sequentially.

When the second driving component 340 operates, the first driving wheel 320, driven by the second driving component 340, rotates to drive each of the third driven wheels to work, thereby driving the respective object's motion attitude adjusting mechanisms 100 to rotate about the axes of the respective bases 210, and thus adjusting the positions of the specific object carriers 140 of the respective object's motion attitude adjusting mechanisms 100. Each third driven wheel drives the respective fifth driving component 220 to operate. The supporting components 130, driven by the respective third driving component 120, swing or roll simultaneously or sequentially, and the object carriers 140 swings or rolls along with the respective supporting components 130 and rotate simultaneously or sequentially.

In this embodiment, in the case where the first driving wheel 320 is a gear with gear teeth close to each other, the third driven wheels can be driven by the gear simultaneously when the gear rotates. In the case where the gear is provided with gear teeth with intervals therebetween, the third driven wheels are sequentially driven by the gear when the gear rotates. In the case where the first driving wheel 320 is a friction wheel with the same friction coefficient on different portions, and the friction generated between the first driving wheel 320 and the third driven wheel 320 is sufficient to drive the third driven wheel 320, the third driven wheels can be driven by the friction wheel simultaneously when the friction wheel rotates. In the case where the friction wheel has different friction coefficients on different portions, and the friction coefficients of some friction surfaces are set to 0 or close to 0 so that said friction surfaces cannot drive the third driven wheels, the third driven wheels are sequentially driven by the friction wheel when the friction wheel rotates.

In the case where the first driving wheel 320 drives the third driven wheels sequentially, the first driving wheel 320 can be a half-gear or a fan-shaped gear. When the first driving wheel 320 rotates, the third driven wheels in contact with the first driving wheel 320 can be rotated, so that the third driven wheels can be driven sequentially. In this case, the first driving wheel 320 should be much larger than the third driven wheel. Otherwise, when the first driving wheel 320 comes into contact with the third driven wheel and then moves away from the third driven wheel, the power transmitted to the later supporting component 130 would not be able to drive the supporting component 130 to swing or roll completely. Further, when the third driven wheel drives the supporting component 130 to roll, the transmission ratio between the first driving wheel 320 and the third driven wheel will also influence the roll. If the transmission ratio is great, the third driven wheel will suffer a great force, so that the supporting component 130 can be rolled in a complete circle. The operation is the same as that as shown in FIG. 18 in which the third driving wheel 221 drives the third driving components 120 sequentially.

The fifth driving component 220 driving the third driving component 120 to move, the third driving component 120 driving the supporting component 130 to swing or roll, the supporting component 130 driving the object carrier 140 to swing or roll, and the fourth driving component 150 driving the object carrier 140 to rotate are occurred simultaneously, so that the object's motion attitude adjusting mechanisms 100 can drive the objects placed on the object carriers 140 to rotate and roll simultaneously.

Alternatively, driven by the fifth driving component 220, the third driving components 120 sequentially drive the respective supporting component 130 to swing or roll, and the supporting components 130 drive the object carriers 140 to swing or roll. The fourth driving component 150 drives the object carrier 140 to rotate. The third driving components 120 operate sequentially, so that the object's motion attitude adjusting mechanisms 100 can sequentially drive the objects to swing or roll while rotating.

The object's motion attitude adjusting device 200 of the present embodiment is provided with a plurality of object's motion attitude adjusting mechanisms 100. A plurality of objects on the object's motion attitude adjusting mechanisms 100 can swing or roll simultaneously or sequentially, and can also rotate while swinging or rolling, without need to separately providing the individual object's motion attitude adjusting mechanisms 100, providing an extremely high integration.

It should be noted that the supporting component 130 is not directly, but indirectly driven by the fifth driving component 220 to swing or roll. Similarly, the object carrier 140 is not directly, but indirectly driven by the fifth driving component 220 to swing or roll and rotate at the same time. For example, the fifth driving component 220 drives the third driving component 120 to work, and the third driving component 120 in turn drives the supporting component 130 to swing or roll. That is, the supporting component 130 is indirectly driven by the fifth driving component 220. The supporting component 130 in turn drives the object carrier 140 to swing or roll, and as the object carrier 140 swings or rolls, the fourth driving component 150 drives the object carrier 140 to rotate simultaneously, which also indicates that the object carrier 140 is indirectly driven by the fifth driving component 220.

Embodiment 15

Referring to FIG. 18, on the basis of the fourteenth embodiment, the fifth driving component 220 of the fifteenth embodiment has a third driving wheel 221;

The third driving component 120 is a driven wheel or a driven wheel set connected to the third driving wheel 221 and the respective supporting component 130 in a transmission manner, respectively.

The first driving wheel 320 drives the third driven wheel to rotate. As the third driving wheel 221 is a stationary wheel and keeps stationary, the driven wheel or the driven wheel set connected with the third driving wheel 221 rotates. The driven wheel or the driven wheel set drives the supporting component of the respective object's motion attitude adjusting mechanism 100 to swing or roll, and drives the respective object carrier 140 to rotate while swinging or rolling along with the respective supporting component 130.

In the case where the third driving component 120 is a driven wheel connected with the third driving wheel 221 and the respective supporting component 130 in a transmission manner, respectively, the third driving wheel 221 can rotate to drive the driven wheel to rotate, and the driven wheel in turn drives the supporting component 130 to swing or roll. The third driving wheel 221 can be an external gear. The third driving wheel 221 is disposed at the centre position of the driven wheels of the object's motion attitude adjusting mechanisms 100 and meshed with the driven wheels, so that when the third driving wheel 221 rotates, it can drive the driven wheels to rotate simultaneously or sequentially.

Figure 19:
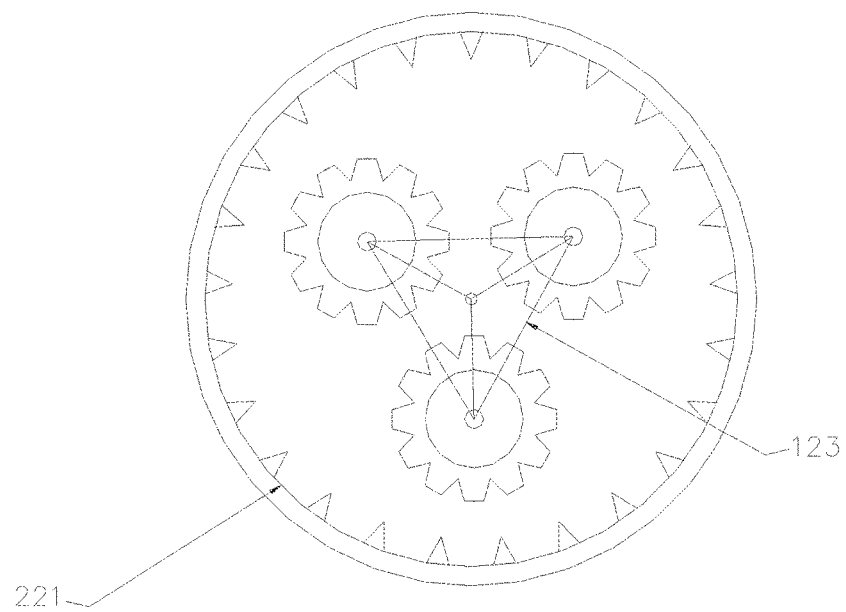
FIG. 19 is a schematic view of a third driving wheel cooperating with a driven wheel when the third driving wheel is an internal gear according to an embodiment of the present invention.

Alternatively, referring to FIG. 19, the third driving wheel 221 can also be an internal gear. The third driving wheel 221 surrounds the driven wheels of the object's motion attitude adjusting mechanisms 100, and is meshed with the driven wheels. The central shafts of the driven wheels are connected by a central hinge 123. Under an external force, the central hinge 123 rotates while the third driving wheel 221 is stationary, and the central hinge 123 simultaneously or sequentially rotates the driven wheels.

Referring to FIG. 8, in the case where the third driving component 120 is a driven wheel set connected with the third driving wheel 221 and the respective supporting component 130 in a transmission manner, respectively, the driven wheel set includes a horizontally disposed horizontal wheel 121 and a vertically disposed vertical wheel 122 meshed with each other. The third driving wheel 221 drives the horizontal wheel 121 to rotate, the horizontal wheel 121 drives the vertical wheel 122 to rotate, and the vertical wheel 122 in turn drives the supporting component 130 to swing or roll. As the supporting component 130 needs a certain motion space while swinging or rolling, the vertically disposed vertical wheel 122 is provided to enlarge the motion space of the supporting component 130, in order to ensure that the supporting component 130 can swing or roll smoothly and completely. The third driving wheel 221 can be an external gear. The third driving wheel 221 is disposed at a centre of the horizontal wheels 121 of the object's motion attitude adjusting mechanisms 100 and meshed with the horizontal wheels 121. The horizontal wheels 121 can be driven to rotate simultaneously or in turn when the third driving wheel 221 rotates, and the horizontal wheels 121 in turn drive the vertical wheels 122 to rotate.

Alternatively, referring to FIG. 19, the third driving wheel 221 can be an internal gear. The third driving wheel 221 is disposed at the outer peripheries of the horizontal wheels 121 of the object's motion attitude adjusting mechanisms 100, and meshes with the horizontal wheels 121. The central shafts of the horizontal wheels are connected by a central hinge 123. Under an external force, the central hinge 123 rotates while the third driving wheel 221 is stationary, the central hinge 123 drives the horizontal wheels 121 to rotate simultaneously or sequentially, and the horizontal wheels 121 drive the vertical wheels 122 to rotate.

In this embodiment, in the case where the third driving wheel 221 is a gear with gear teeth close to each other, the third driving components 120 can be driven by the gear simultaneously when the gear rotates. In the case where the gear is provided with gear teeth with intervals therebetween, the third driving components 120 are sequentially driven by the gear when the gear rotates. In the case where the third driving wheel 221 is a friction wheel with the same friction coefficient on different portions, and the friction generated between the third driving wheel 221 and the third driving component 120 is sufficient to drive the third driving component 120, the third driving components 120 can be driven by the friction wheel simultaneously when the friction wheel rotates. In the case where the friction wheel has different friction coefficients on different portions, and the friction coefficients of some friction surfaces are set to 0 or close to 0 so that said friction surfaces cannot drive the third driving component 120, the third driving component 120 are sequentially driven by the friction wheel when the friction wheel rotates.

In the case where the third driving wheel 221 drives the third driving components 120 sequentially, and the third driving wheel 221 is a half-gear or a fan-shaped gear, when the third driving wheel 221 rotates, the third driving components 120 in contact with the third driving wheel 221 can rotate, so that the third driving components 120 can be driven sequentially. In this case, the third driving wheel 221 should be much larger than the third driving component 120. Otherwise, when the third driving wheel 221 comes into contact with the third driven wheel and then moves away from the third driving component 120, the third driving component 120 cannot drive the supporting component 130 to swing or roll completely. Further, when the third driving component 120 drives the supporting component 130 to roll, the transmission ratio between the third driving wheel 221 and the third driving component 120 will also affect the smooth roll. If the transmission ratio is great, the third driving component 120 will suffer a greater force, so that the supporting component 130 can be rolled in a complete circle.

Embodiment 16

Referring to FIG. 18, on the basis of the fifteenth embodiment, the driven wheel set of the sixteenth embodiment includes:

a primary driven wheel 1211 connected to the supporting component 130 in a transmission manner, and a secondary driven wheel 1212 connected to the third driving wheel 221 in a transmission manner.

The primary driven wheel 1211 and the secondary driven wheel 1212 serve as the horizontal wheel 121 as described in the fifteenth embodiment.

The primary driven wheel 1211 and the secondary driven wheel 1212 are connected through a fixing shaft, so that the two driven wheels are coaxially arranged, and when the secondary driven wheel 1212 rotates, the primary driven wheel 1211 can be driven to rotate. Alternatively, the primary driven wheel 1211 and the secondary driven wheel 1212 are disposed non-coaxially, but the two driven wheels are connected to each other, and when the secondary driven wheel 1212 rotates, it will drive the primary driven wheel 1211 to rotate. The coaxial arrangement of the primary driven wheel 1211 and the secondary driven wheel 1212 can save more space and have better integration than the non-coaxial arrangement.

When the third driving wheel 221 drives the secondary driven wheel 1212 to rotate, the secondary driven wheel 1212 drives the primary driven wheel 1211 to rotate, and the primary driven wheel 1211 drives the supporting component 130 to swing or roll. Specifically, the primary driven wheel 1211 is connected with the second driven wheel 132 of the ninth embodiment in a transmission manner. When the primary driven wheel 1211 rotates, it will drive the second driven wheel 132 to rotate, so that the supporter 131 can swing or roll.

In this embodiment, the primary driven wheel 1211 and the secondary driven wheel 1212 are both gears. It can also be conceived that the primary driven wheel 1211 and the secondary driven wheel 1212 are both friction wheels.

In this embodiment, the third driving wheel 221 and the secondary driven wheel 1212 are located in the same plane, and the secondary driven wheel 1212 and the primary driven wheel 1211 are located in the same plane or horizontal planes. The primary driven wheel 1211 and the second driven wheel 132 are perpendicular to each other, so that the power transmission direction can be changed (i.e., from horizontal to vertical). Further, through the arrangement of the primary driven wheel 1211 and the secondary driven wheel 1212, the primary driven wheel 1211 and the secondary driven wheel 1212 can be individually and differentially designed in transmission ratio, so that the power transmission ratio can be changed, in order to ensure that all wheels can work smoothly.

In the above embodiments, the principle of controlling the opening of the object carrier 140 to face upward is described in detail herein.

Figure 20:
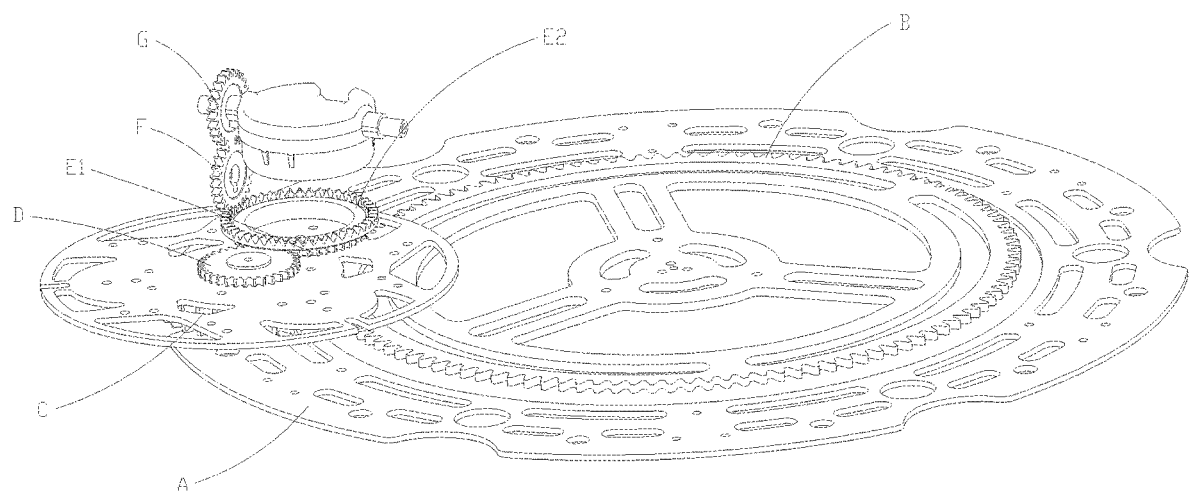
FIG. 20 is a schematic view showing gear transmission according to an embodiment of the present invention.

Referring to FIG. 20, A represents the turntable, B represents the first driving wheel, C represents the third driven wheel, D represents the first driving wheel, E1 represents the secondary driven wheel, E2 represents the primary driven wheel, F represents the vertical wheel, and G represents the second driven wheel.

B, C, D, E1, E2, F and G are all gears.

Figure 21:
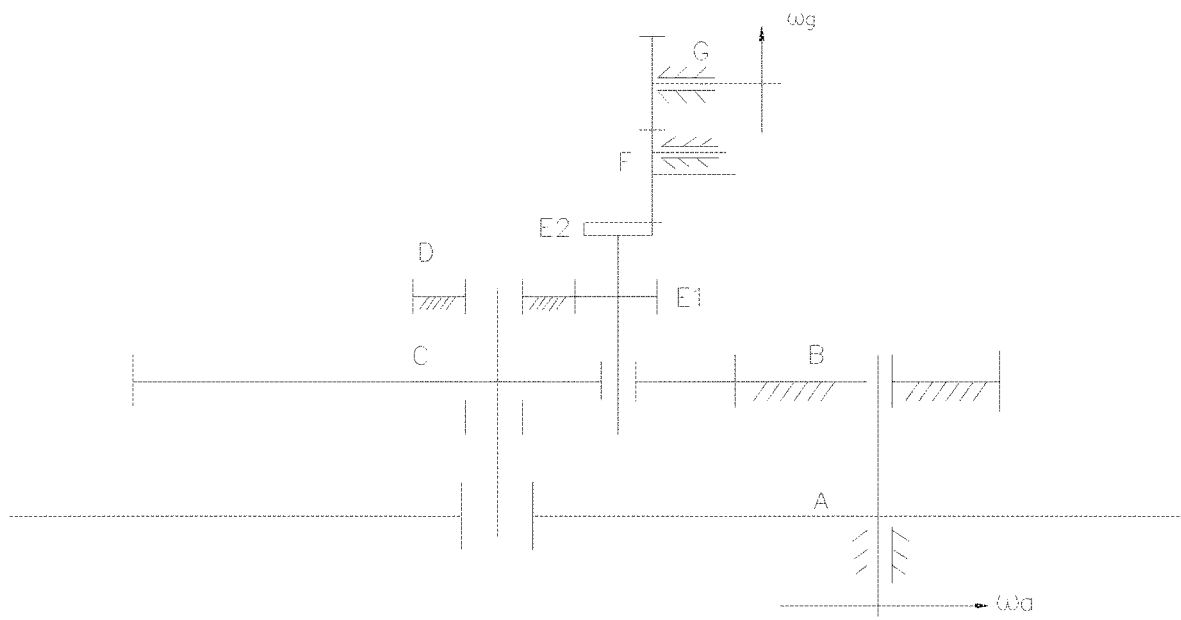
FIG. 21 is a simplified model of gear transmission when a turntable is moved according to an embodiment of the present invention.

When A moves, the above gears can be simplified in model as shown in FIG. 21.

When two gears mesh with each other, the instantaneous linear velocities of the two gears are equal at the meshed portions. When the B and C gears mesh with each other, C is a planetary gear which has both a rotation speed $\omega c1$ and a revolution speed $\omega c2=\omega a$, wherein:
- (a) B and C transmission: $\omega a*Rb=\omega c1*Rc$, which means that the circumferential distance traveled by C along the circumference of B for revolution is equal to the distance traveled by C for rotation.
- (b) D and E1 transmission: $\omega c1*Rd=\omega e1*Re1$, the circumferential distance traveled by disc E1 along the circumference of the gear D is equal to the distance traveled by the disc E1 for rotation, and the angular velocity of the E1 for revolution is equal to $\omega c1$.
- (c) E2 and F transmission: $\omega e1*Re2=\omega f*Rf$, where E and F only consider the angular velocities $\omega e1$ and $\omega f$ for rotation.
- (d) F and G transmission: $\omega f*Rf=\omega g*Rg$, where F and G only consider the angular velocities $\omega f$ and $\omega g$ for rotation.

From the above formulas (a)-(d), the transmission ratio for revolution is $I1=\omega g/\omega a=(Rf*Re2*Rb*Rd)/(Rf*Re1*Rg*Rc)/(Zf*Ze2*Zb*Zd)/(Zf*Ze1*Zg*Zc)$.

It can be concluded that the transmission ratio $I1=\omega g/\omega a$=multiple of the number of the object's motion attitude adjusting devices 200. As long as this condition is satisfied, it can be ensured that each time A revolves by an angle, the object carrier 140 of each object's motion attitude adjusting device 200 faces vertically upward.

If six object's motion attitude adjusting devices 200 are provided, I1 must be a multiple of 6. If I1 is equal to 6, A rotates an angle of ⅙ circumference, G rotates a complete circumference, and the object carrier 140 will still face vertically upward.

Figure 22:
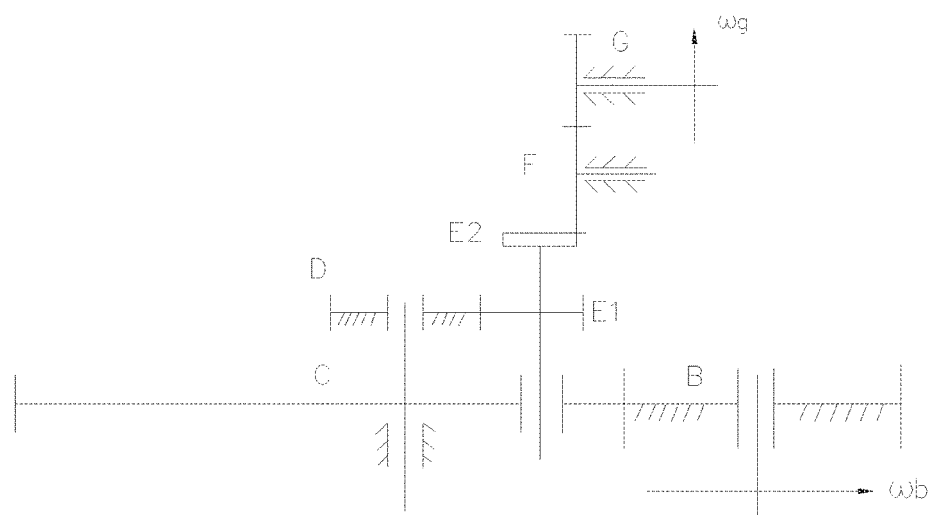
FIG. 22 is a simplified model of gear transmission when a first driving wheel is moved according to an embodiment of the present invention.

When B moves, the above gears can be simplified in model as shown in FIG. 22.

The formulas can be formulated as:
- (a) $\omega c1*Rd=\omega e1*Re1$, the circumferential distance traveled by E1 along the circumference of D for revolution is equal to the distance traveled by E1 for rotation, and the angular velocity of E1 for revolution is equal to $\omega c1$.
- (b) E2 and F transmission: $\omega e1*Re2=\omega f*Rf$, where E and F only consider the angular velocities $\omega e1$ and $\omega f$ for rotation.
- (c) F and G transmission: $\omega f*Rf=\omega g*Rg$, where F and G only consider angular velocities $\omega f$ and $\omega g$ for rotation.

From the above formulas (a)-(c), the transmission ratio for rotation is:

$$I2=\omega c1=(Rf*Re2*Rd)/(Rf*Re1*Rg)/(Zf*Ze2*Zd)/(Zf*Ze1*Zg).$$

If Zf in the formula is divided, the formula can be simplified to:

Transmission ratio $I2=(Ze2*Zd)/(Ze1*Zg)$.

In the formula, the transmission ratio 12 for rotation must be equal to an integral multiple of the number of the object's motion attitude adjusting mechanisms 100.

If three object's motion attitude adjusting mechanisms 100 are provided, each object's motion attitude adjusting mechanism 100 is provide with one object carrier 140, that is, I2 must be a multiple of 3, so that each time C rotates to a station to transfer a different object carrier 140 to the puncturing and liquid filling position, the object carrier 140 still faces vertically upward. From the transmission ratio for revolution, $I1=I2*Zb/Zc$ can be obtained.

Here, it should be noted that W represents the rotational angular velocity of the gear, the subscript g represents G, and Wg represents the rotational angular velocity of G. R represents the radius of the gear, the subscript b represents B, and Rb represents the radius of B. Z represents the number of gear teeth, the subscript g represents G, and Zg represents the number of teeth of G.

Embodiment 17

This seventeenth embodiment provides a puncturing, liquid filling and mixing system, which includes:
- a frame;
- a puncturing module;
- a liquid filling module; and
- an object's motion attitude adjusting apparatus 300 as described in Embodiments 1 to 16.

The puncturing module, the liquid filling module and the object's motion attitude adjusting apparatus 300 are all arranged on the frame;

The object's motion attitude adjusting apparatus 300 transfers the container to the puncturing and liquid filling position, the puncturing module punctures the container cover, the liquid filling module fills liquid to the container, and the object's motion attitude adjusting apparatus 300 operates to mix the subjects in the container.

The puncturing module, the liquid filling module and the object's motion attitude adjusting apparatus 300 are all arranged on the frame and are supported by the frame.

The puncturing, liquid filling and mixing system can be used for mixing various subjects such as chemicals and blood.

The working process of the puncturing, liquid filling and mixing system is as follows:

The containers containing subjects are placed on the object carriers 140. The first driving component 330 drives the turntable 310 to rotate, so as to drive the object's motion attitude adjusting devices 200 located on the turntable 310 to rotate, thereby adjusting the positions of the object's motion attitude adjusting devices 200. The second driving component 340 drives the first driving wheel 320 to rotate, so as to drive the object's motion attitude adjusting mechanisms 100 of the object's motion attitude adjusting devices 200 to rotate, thereby adjusting the positions of the object's motion attitude adjusting mechanisms 100.

After a certain object's motion attitude adjusting mechanism 100 reaches below the puncturing module, the puncturing module punctures the container cover, and the liquid filling module fills liquid to the container. Subsequently, the second driving component 340 continues to drive the first driving wheel 320 to rotate to adjust the positions of the object's motion attitude adjusting mechanisms 100, thereby repeating the puncturing and liquid filling operation for the container on the next object's motion attitude adjusting mechanism 100.

After all the object's motion attitude adjusting mechanisms 100 on the object's motion attitude adjusting device 200 completes the puncturing and liquid filling operation, the first driving component 330 continues to drive the turntable 310 to rotate until the next object's motion attitude adjusting device 200 is driven to the puncturing and liquid filling position.

During the rotation of the first driving wheel 320, the object carrier 140 drives the container to rotate while swinging or rolling, so that the subjects can be mixed.

Through this puncturing, liquid filling and mixing system, batch and automatic mixing operation can be realized, so as to solve the problems of low accuracy and low efficiency of manual operation.

Specifically, the puncturing, liquid filling and mixing system can be apply to redissolution equipment to realize batch and automatic redissolution and mixing operation. Redissolution refers to that after the solvent is added to the powder reagent such as frozen dry powder, the powder reagent dissolves into the previous solution state. In order to preserve certain protein substances for a long period of time, for example, a factory will freeze-dry the protein substances into a powder form and store them in a glass bottle. In use, add a solvent to the freeze-dried protein substances in the powder form, causing the protein substances to dissolve into the previous state.

Further, the puncturing, liquid filling and mixing system includes a temperature control module which includes a temperature detection sub-module, a temperature adjustment sub-module and a temperature control sub-module. The temperature control sub-module is connected with the temperature detection sub-module and the temperature adjustment sub-module, respectively. Under the control of the temperature control sub-module, the temperature detection sub-module detects the actual temperature of the object carrier 140 (or directly detects the temperature of the object on the object carrier 140). Comparing the actual temperature with the preset temperature, the temperature adjustment sub-module is controlled to adjust the temperature of the object carrier 140 according to the comparison result (or directly adjust the temperature of the object on the object carrier 140). For example, provided that the preset temperature is 24° C., if the temperature detection sub-module detects that the temperature of the object carrier 140 is 22° C., the temperature adjustment sub-module adjusts the temperature of the object carrier 140 so that the temperature of the object carrier 140 increases to 24° C., in such a way that the temperature control module can maintain the object carrier 140 (or the object on the object carrier 140) at an appropriate temperature, thereby ensuring the mixing effect.

In this embodiment, the temperature adjustment sub-module can be a heating wire disposed at the periphery of the object's motion attitude adjusting mechanism 100. The temperature is adjusted by the heating effect of the heating wire. Alternatively, the temperature adjustment sub-module can be an electric hair dryer arranged beside the turntable 310, and the temperature can be adjusted by the electric hair dryer.

In this embodiment, the puncturing module and the liquid filling module are not specifically limited. Mechanical modules capable of automatically puncturing the container and automatically filling liquid to the container fall within the protection scope of the present invention.

In all of the above-mentioned embodiments, where "rotate" is described, either rotating in a complete circle or in a semi-circle falls within the protection scope of the present invention. Further, where "wheel" is described, such as a driving wheel, a driven wheel, or the like, either the wheel in the form of a complete circle or the wheel in the form of an incomplete circle such as a semi-circle wheel falls within the protection scope of the present invention.

The above embodiments are merely preferred embodiments of the present invention and are not intended to limit the present invention. Any modification, equivalent substitution, improvement, etc. made within the spirit and principle of the present invention, should fall in the scope of protection of the present invention.

What is claimed is:

1. An object's motion attitude adjusting apparatus, comprising:
   a turntable;
   a plurality of object's motion attitude adjusting devices provided on the turntable, the object's motion attitude adjusting device comprising a base and a plurality of object's motion attitude adjusting mechanisms provided on the base;
   a first driving wheel connected with each of the object's motion attitude adjusting mechanisms in a transmission manner;
   a first driving component connected with the turntable for driving the turntable; and
   a second driving component connected with the first driving wheel for driving the first driving wheel;
   wherein when the first driving component is in operation, driven by the first driving component, the turntable rotates to drive the object's motion attitude adjusting devices to move circumferentially around an axis of the turntable; and when the second driving component is in operation, driven by the second driving component, the first driving wheel rotates to drive the object's motion attitude adjusting mechanisms to move circumferentially around axes of the respective bases and to adjust the motion attitudes thereof.

2. A puncturing and fluid filling and mixing system, comprising:
   a frame;
   a puncturing module;
   a fluid filling module; and
   the object's motion attitude adjusting apparatus according to claim 1; wherein
   the puncturing module, the liquid filling module and the object's motion attitude adjusting apparatus are all provided on the frame; and
   the object's motion attitude adjusting apparatus is configured to transfer a container to a puncturing and liquid filling position, the puncturing module is configured to puncture a cover of the container, the liquid filling module is configured to fill liquid to the container, and the object's motion attitude adjusting apparatus is configured to operate to mix contents of the container.

3. The object's motion attitude adjusting apparatus according to claim 1, wherein the first driving component comprises:
   a first transmission shaft; and
   a first power output component connected with the first transmission shaft.

4. The object's motion attitude adjusting apparatus according to claim 3, wherein the second driving component comprises:
   a second transmission shaft connected with the first driving wheel; and
   a second power output component connected with the second transmission shaft.

5. The object's motion attitude adjusting apparatus according to claim 4, wherein the first power output component comprises a first motor connected with the first transmission shaft, a first wheel provided on the first transmission shaft, and a second wheel meshed with the first wheel and provided on the second transmission shaft through a bearing, and wherein the second wheel is fixedly connected with the turntable; and the second power output component comprises a second motor connected with the second transmission shaft.

6. The object's motion attitude adjusting apparatus according to claim 1, wherein the object's motion attitude adjusting mechanism comprises:
   a frame;
   a third driving component;

a supporting component provided on the frame and connected with the third driving component in a transmission manner;

an object carrier provided on the supporting component and movable relative to the supporting component; and a fourth driving component provided on the frame and connected with the object carrier in a transmission manner;

wherein when the third driving component drives the supporting component to swing or roll, the object carrier swings or rolls along with the supporting component while being rotated by the fourth driving component.

7. The object's motion attitude adjusting apparatus according to claim 6, wherein the frame comprises:

two support columns; wherein the supporting component is connected with the two support columns through shaft(s).

8. The object's motion attitude adjusting apparatus according to claim 6, wherein the object's motion attitude adjusting device further comprises:

a fifth driving component provided on the base and connected with the third driving component of each of the object's motion attitude adjusting mechanisms in a transmission manner, and a third driven wheel fixed below the base and connected with the first driving wheel in a transmission manner;

wherein the first driving wheel is configured to drive the third driven wheel to rotate, thereby driving the fifth driving component to operate; the fifth driving component is configured to drive the respective third driving components to operate simultaneously or sequentially; the third driving component is configured to drive the supporting component of the respective object's motion attitude adjusting mechanism to swing or roll, and drive the respective object carrying portion to rotate while swinging or rolling with the respective supporting component.

9. The object's motion attitude adjusting apparatus according to claim 8, wherein the fifth driving component has a third driving wheel; and the third driving component is a driven wheel or a driven wheel set connected with the third driving wheel and the respective supporting component in a transmission manner, respectively.

10. The object's motion attitude adjusting apparatus according to claim 9, wherein the driven wheel set comprises:

a primary driven wheel connected with the supporting component in a transmission manner, and a secondary driven wheel connected with the third driving wheel in a transmission manner.

11. The object's motion attitude adjusting apparatus according to claim 6, wherein the object carrier comprises:

an object carrying portion; and a first driven wheel provided on the object carrying portion and connected with the fourth driving component in a transmission manner;

wherein the object carrying portion is provided with at least one object receiving space.

12. The object's motion attitude adjusting apparatus according to claim 11, wherein the fourth driving component is a second driving wheel connected with the first driven wheel in a transmission manner.

13. The object's motion attitude adjusting apparatus according to claim 12, wherein the second driving wheel is a static wheel, and the static wheel is fixed on the frame.

14. The object's motion attitude adjusting apparatus according to claim 11, wherein the supporting component comprises:

a supporter rotatably assembled with the object carrying portion for driving the object carrying portion to swing or roll, and a second driven wheel provided on the supporter and connected with the third driving component in a transmission manner.

15. The object's motion attitude adjusting apparatus according to claim 14, wherein the second driven wheel is a gear, and a rotational angular velocity ratio of the second driven wheel to the turntable is in a multiple relationship with the number of the object's motion attitude adjusting devices.

16. The object's motion attitude adjusting apparatus according to claim 14, wherein the second driven wheel and the first driving wheel are both gears, and a rotational angular velocity ratio of the second driven wheel to the first driving wheel is in a multiple relationship with the number of the object's motion attitude adjusting mechanisms.

17. The object's motion attitude adjusting apparatus according to claim 14, wherein the first driven wheel is fixedly fitted to an outer periphery of the object carrying portion; and the object carrying portion is inserted in the supporter and limited by and rotatably engaged with the supporter.

* * * * *